US012246330B2

(12) United States Patent
Park et al.

(10) Patent No.: US 12,246,330 B2
(45) Date of Patent: Mar. 11, 2025

(54) DUST COLLECTING APPARATUS FOR ELECTRIC PRECIPITATOR

(71) Applicant: Hanon Systems, Daejeon (KR)

(72) Inventors: Ji-Yong Park, Daejeon (KR); Ki Hong Kim, Daejeon (KR); Jae Ho Kim, Daejeon (KR)

(73) Assignee: HANON SYSTEMS, Daejeon (KR)

(*) Notice: Subject to any disclaimer, the term of this patent is extended or adjusted under 35 U.S.C. 154(b) by 809 days.

(21) Appl. No.: 17/421,963

(22) PCT Filed: Jan. 10, 2020

(86) PCT No.: PCT/KR2020/000482

§ 371 (c)(1),
(2) Date: Jul. 9, 2021

(87) PCT Pub. No.: WO2020/145730

PCT Pub. Date: Jul. 16, 2020

(65) Prior Publication Data

US 2022/0111399 A1 Apr. 14, 2022

(30) Foreign Application Priority Data

Jan. 11, 2019 (KR) ........................ 10-2019-0003671
Nov. 6, 2019 (KR) ........................ 10-2019-0140709

(51) Int. Cl.
*B03C 3/08* (2006.01)
*B03C 3/47* (2006.01)
*B03C 3/86* (2006.01)

(52) U.S. Cl.
CPC .................. *B03C 3/08* (2013.01); *B03C 3/47* (2013.01); *B03C 3/86* (2013.01)

(58) Field of Classification Search
CPC .. B03C 3/025; B03C 3/08; B03C 3/40; B03C 3/47; B03C 3/82; B03C 3/86
See application file for complete search history.

(56) References Cited

U.S. PATENT DOCUMENTS 9,457,118 B2 * 10/2016 Ota .......................... A61L 9/00
10,744,516 B2 * 8/2020 Hu ........................... B03C 3/08
2011/0185905 A1 8/2011 Ji et al.

FOREIGN PATENT DOCUMENTS

CN 107427840 A 12/2017
CN 107755096 A 3/2018
(Continued)

OTHER PUBLICATIONS

Office Action issued on Sep. 1, 2023 by the CIPO in the corresponding Patent Application No. 202080076008.X, with English translation.

(Continued)

*Primary Examiner* — Christopher P Jones
*Assistant Examiner* — Sonji Turner
(74) *Attorney, Agent, or Firm* — NORTON ROSE FULBRIGHT US LLP

(57) ABSTRACT

A dust collecting apparatus for an electric precipitator, capable of adsorbing and filtering fine dust contained in air in an air ventilation apparatus such as an air conditioner or an air purifier and, more specifically, to a dust collecting apparatus for an electric precipitator which is capable of improving manufacturability and dust collection performance because the dust collecting apparatus comprises a first connection unit that is continuously provided on one side of a plurality of first dust collection plates, and is capable of improving assemblability because a first dust collection unit and a second dust collection unit can be assembled at accurate positions in a first case and a second case, respectively.

18 Claims, 22 Drawing Sheets

(56) References Cited

FOREIGN PATENT DOCUMENTS

| | | | | |
|---|---|---|---|---|
| DE | 2146288 | | * | 9/1973 |
| DE | 102017209117 | | * | 12/2018 |
| JP | 0751594 | A | * | 2/1995 |
| JP | H0751594 | A | | 2/1995 |
| JP | H10382 | A | | 1/1998 |
| JP | 2010115618 | A | | 5/2010 |
| KR | 200142511 | Y1 | * | 6/1999 |
| KR | 100495627 | B1 | | 6/2005 |
| KR | 100722863 | B1 | * | 5/2007 |
| KR | 20110002365 | U | | 3/2011 |
| KR | 20160099310 | A | | 8/2016 |
| KR | 20170004199 | A | | 1/2017 |
| KR | 20180076031 | A | | 7/2018 |
| KR | 20190055906 | A | | 5/2019 |
| KR | 20190055922 | A | | 5/2019 |
| KR | 20190065872 | A | | 6/2019 |

OTHER PUBLICATIONS

International Search Report issued in PCT/KR2020/000482 on Apr. 21, 2020.

* cited by examiner

PRIOR ART

PRIOR ART (a)

DUST COLLECTING APPARATUS FOR ELECTRIC PRECIPITATOR

CROSS REFERENCE TO RELATED APPLICATIONS

This application is a national phase under 35 U.S.C. § 371 of International Application No. PCT/KR2020/000482 filed on Jan. 10, 2020, which claims the benefit of priority from Korean Patent Application Nos. 10-2019-0003671 filed on Jan. 11, 2019 and 10-2019-0140709 filed on Nov. 6, 2019. The entire contents of these applications are incorporated herein by reference in their entirety.

TECHNICAL FIELD

The present invention relates to a dust collecting apparatus for an electric precipitator, which may absorb and filter fine dust contained in air in an air conditioning apparatus such as an air conditioner or an air purifier, and more particularly, to a dust collecting apparatus for an electric precipitator, which may improve manufacturability and dust collecting performance because the dust collecting apparatus includes a first connection unit that is continuously provided on one side of a plurality of first dust collecting plates, and may increase assemblability because a first dust collecting unit and a second dust collecting unit may be assembled at accurate positions in a first case and a second case, respectively.

BACKGROUND ART

In general, in order to remove contaminants such as dust and mote contained in air or gas, a filter using a non-woven fabric composed of fine fibers is used. Since a general fibrous filter has a limit in reducing a size of the pores, it may not filter out dust particles smaller than the pores. In addition, in the case of excessively reducing the size of the pores, since an air volume is reduced and the pores are early clogged by large dust particles, there is a disadvantage that the life of the filter is very short. Therefore, an electric precipitation filter that prevents the reduction in the air volume, does not have a problem of clogging of the pores by the large particles, and may filter out impurity particles with a very small size is used.

As illustrated in FIG. 1, the electric precipitation filter may remove fine particles from air or gas passing between dust collecting plates by disposing a plurality of separately formed dust collecting plates 42*a* and 42*b* at regular intervals, and alternately applying a high voltage of an anode and a high voltage of a cathode one by one to absorb dust particles charged with opposite polarity on surfaces of the dust collecting plates 42*a* and 42*b* having a polarity of the anode or a polarity of the cathode.

However, as illustrated in FIG. 2, the dust collecting plates 42*a* and 42*b* have holes formed to penetrate through both sides for electrical connection, and through bars 44*a* and 44*b* are inserted to pass through the holes formed in the dust collecting plates 42*a* and 42*b*. In this case, the anode dust collecting plates 42*a* are in contact with the through bar 44*a* connected to an anode high voltage supplying unit and are electrically connected to each other, and are spaced apart from the through bar 44*b* connected to the cathode high voltage supplying unit and are not electrically connected to each other. Conversely, the cathode dust collecting plates 42*b* are in contact with the through bar 44*b* connected to the cathode high voltage supplying unit and are electrically connected to each other, and are spaced apart from the through bar 44*a* connected to the anode high voltage supplying unit and are not electrically connected to each other.

However, since the penetrating bars are inserted and coupled to penetrate the plurality of dust collection plates configured separately as described above, the through bars block a flow path through which air passes, which is a space between the dust collecting plates, so that dust collecting performance may be deteriorated. In addition, in the portions where the through bars and the dust collecting plates are in contact with each other and are coupled to each other, portions in which the contact is not accurately made and is not made may occur, and when foreign substances or conductive materials flow to and are accumulated in the hole portions in which the dust collecting plates are not in contact with the through bars and spaced apart therefrom, an electric discharge may occur, thereby deteriorating dust collection performance. In addition, there is a difficulty in coupling and assembling the dust collecting plates and the through bars.

In addition, in the case of forming a through electrode in order to connect the electrodes to the plurality of dust collecting plates and sealing using a sealing material, it is necessary to individually connect the plurality of dust collecting plates to the through electrode, and it takes time to harden the sealing material, thereby increasing production time and cost. In addition, such a manufacturing method has a problem in that odors and the like are caused by using the sealing material, and electrical stability may be lowered by individual electrical connections.

RELATED ART DOCUMENT

Patent Document

KR 10-0722863 B1 (2007.05.22.)

DISCLOSURE

Technical Problem

An object of the present invention provides a dust collecting apparatus for an electric precipitator, which may further increase dust collecting performance by increasing manufacturability and increasing electrical stability by using a connection unit continuously provided on one side of a plurality of dust collecting plates.

In particular, an object of the present invention provides a dust collecting apparatus for an electric precipitator that may be simply manufactured in a form that is bonded to each other using one sheet except for a region where a connection unit is formed, may further increase productivity because it does not require an individual assembly process for power connection, and is easy to assemble.

In addition, an object of the present invention provides a dust collecting apparatus for an electric precipitator, which may increase assemblability and improve dust collecting performance because a first dust collecting unit and a second dust collecting unit may be assembled at accurate positions in a first case and a second case, respectively.

In particular, an object of the present invention provides a dust collecting apparatus for an electric precipitator, which may accurately fix a first dust collecting unit and a second dust collecting unit to the cases without a separate means because a second protruding fixing portion and a fourth protruding fixing portion may be further formed on the first case and the second case to easily support the first dust collecting unit (a first dust collecting plate and a first connection unit) and a second dust collecting unit (a second dust collecting plate and a second connection unit).

Technical Solution

In one general aspect, a dust collecting apparatus 1000 for an electric precipitator includes a first dust collecting unit 120 including a plurality of first dust collecting plates 121 disposed side by side to be spaced apart by a predetermined distance, and a plurality of first connection units 122 continuously formed on one side of both end portions of the first dust collecting plates 121 to electrically connect adjacent first dust collecting plates 121 in series.

The dust collecting apparatus 1000 may further include a second dust collecting unit 220 including a plurality of second dust collecting plates 221 disposed side by side to be spaced apart by a predetermined distance, and a plurality of second connection units 222 continuously formed on the other side of both end portions of the second dust collecting plates 221 to electrically connect adjacent second dust collecting plates 221 in series, fitted to the first dust collecting unit 120 such that the first dust collecting plate 121 and the second dust collecting plate 221 are alternately disposed while facing each other, and disposed so as not to be in contact with the first dust collecting unit 120.

The dust collecting apparatus 1000 may further include a first case 110 in which a first opening 110*a* with a hollow inside is formed, and a first protruding fixing portion 111 supporting one side of the first dust collecting plate 121 on which the first connection unit 122 of the first dust collecting unit 120 is formed.

The first protruding fixing portion 111 may be alternately formed with a first protruding fixing portion 111*a* and a second protruding fixing portion 111*b* that support the first dust collecting unit 120 at different heights in a length direction of the first dust collecting plate 121 in a stacking direction of the first dust collecting plate 121.

The first case 110 may be formed with a first protruding supporting portion 112 that supports the other side of the first dust collecting plate 121 on which the first connection unit 122 of the first dust collecting unit 120 is not formed.

The dust collecting apparatus 1000 may further include a second case 210 in which a second opening 210*a* with a hollow inside is formed, and a second protruding fixing portion 211 supporting the other side of the first dust collecting plate 121 on which the second connection unit 222 of the second dust collecting unit 220 is formed is formed.

The second protruding fixing portion 211 may be alternately formed with a third protruding fixing portion 211*a* and a fourth protruding fixing portion 211*b* that support the second dust collecting unit 220 at different heights in a length direction of the second dust collecting plate 221 in a stacking direction of the second dust collecting plate 221.

The second case 210 may be formed with a second protruding supporting portion 212 that supports one side of the second dust collecting plate 221 on which the second connection unit 222 of the second dust collecting unit 220 is not formed.

The first dust collecting unit 120 may be formed using a single sheet made of a conductive material and a dielectric material surrounding the conductive material, and the first dust collecting plate 121 may be formed by bonding predetermined regions of the sheet to each other in a length direction of the sheet except for a region where the first connection unit 122 is formed.

The second dust collecting unit 220 may be formed using a single sheet made of a conductive material and a dielectric material surrounding the conductive material, and the second dust collecting plate 221 may be formed by bonding predetermined regions of the sheet to each other in a length direction of the sheet except for a region where the second connection unit 222 is formed.

The dust collecting apparatus 1000 may further include a second dust collecting unit 220 including a plurality of second dust collecting plates 221 disposed side by side to be spaced apart by a predetermined distance, and a plurality of second connection units 222 alternately formed at both end portions of the second dust collecting plates 221 to electrically connect adjacent second dust collecting plates 221 in series, fitted to the second dust collecting unit 220 such that the first dust collecting plate 121 and the second dust collecting plate 221 are alternately disposed while facing each other, and disposed so as not to be in contact with the first dust collecting unit 120.

The second dust collecting unit 220 may be formed by bending a single sheet.

The dust collecting apparatus 1000 may further include a first support 311 elongated in the length direction to include a first fixing member 310 that fixes a position of the first dust collecting plate 121.

The dust collecting apparatus 1000 may further include a second support 321 elongated in the length direction to include a second fixing member 320 that fixes a position of the second dust collecting plate 221.

The first dust collecting plate 121 may be formed with a first insertion groove 124 into which the first support 311 of the first fixing member 310 is inserted and fixed on one side in a width direction and may be formed with a first cut-out groove 125 in which the second support 321 of the second fixing member 320 is located on the other side in the width direction, and the second dust collecting plate 221 may be formed with a second cut-out groove 225 in which the first support 311 of the first fixing member 310 is located on one side in a width direction and may be formed with a second insertion groove 224 into which the second support 321 of the second fixing member 320 is inserted and fixed on the other side in the width direction.

In another general aspect, a dust collecting apparatus 1000 for an electric precipitator includes a first dust collecting unit 120 including a plurality of first dust collecting plates 121 disposed side by side to be spaced apart by a predetermined distance, and a plurality of first connection units 122 electrically connecting adjacent first dust collecting plates 121 in series; and a first case 110 in which a first opening 110*a* with a hollow inside is formed, and a first protruding fixing portion 111*a* supporting the first connection unit 122 of the first dust collecting unit 120 is formed.

The first connection unit 122 may be formed in one of a form alternately formed on both end portions of the first dust collecting plate 121 and a form continuously formed on one side of both end portions of the first dust collecting plate 121.

The dust collecting apparatus 1000 may further include a second dust collecting unit 220 including a plurality of second dust collecting plates 221 disposed side-by-side to be spaced apart by a predetermined distance, and a plurality of second connection units 222 electrically connecting adjacent second dust collecting plates 221 in series, fitted to the first dust collecting unit 120 such that the first dust collecting plate 121 and the second dust collecting plate 221 are alternately disposed while facing each other, and disposed so as not to be in contact with the first dust collecting unit 120;

and a second case 210 in which a second opening 210*a* with a hollow inside is formed, and a third protruding fixing portion 211*a* supporting the second connection unit 222 of the second dust collecting unit 220 is formed.

The second connection unit 222 may be formed in one of a form alternately formed on both end portions of the second dust collecting plate 221 and a form continuously formed on the other side of both end portions of the second dust collecting plate 121.

The first protruding fixing portion 111*a* may be in the form of supporting up to a bent region of the first connection unit 122 connected to the first dust collecting plate 121, and the third protruding fixing portion 211*a* may be in the form of supporting up to a bent region of the second connection unit 222 connected to the second dust collecting plate 221.

The first protruding fixing portion 111*a* and the third protruding fixing portion 211*a* may protrude to support the inside or outside of a curved surface of the first connection unit 122 and the second connection unit 222, respectively.

The first protruding fixing portion 111*a* may extend to support the first dust collecting plates 121 on both sides connected to the first connection unit 122, and the third protruding fixing portion 211*a* may extend to support the second dust collecting plates 221 on both sides connected to the second connection unit 222.

The first case 110 may be formed with the first protruding fixing portion 111*a* at an end portion in a length direction of the first dust collecting unit 120, and may be formed with a second protruding fixing portion 111*b* that protrudes to support the first dust collecting plate 121 at a different height from the first protruding fixing portion 111*a* inside the first protruding fixing portion 111*a* in a length direction of the dust collecting apparatus 1000.

The second case 210 may be formed with the third protruding fixing portion 211*a* at an end portion in a length direction of the second dust collecting unit 220, and may be formed with a fourth protruding fixing portion 211*b* that protrudes to support the second dust collecting plate 221 at a different height from the third protruding fixing portion 211*a* inside the third protruding fixing portion 211*a* in a length direction of the dust collecting apparatus 1000.

Advantageous Effects

Accordingly, the dust collecting apparatus for an electric precipitator according to the present invention may further increase dust collecting performance by increasing manufacturability and increasing electrical stability by using the connection unit continuously provided on one side of the plurality of dust collecting plates.

In particular, the dust collecting apparatus for an electric precipitator according to the present invention may be simply manufactured in the form that is bonded to each other using one sheet except for the region where the connection unit is formed, may further increase productivity because it does not require the individual assembly process for power connection, and may be easy to assemble.

In addition, the dust collecting apparatus for an electric precipitator according to the present invention may increase assemblability and improve dust collecting performance because the first dust collecting unit and the second dust collecting unit may be assembled at the accurate positions in the first case and the second case, respectively.

Accordingly, the dust collecting unit for an electric precipitator according to the present invention may accurately fix the first dust collecting unit and the second dust collecting unit to the cases without the separate means because the second protruding fixing portion and the fourth protruding fixing portion may be further formed on the first case and the second case to easily support the first dust collecting unit (the first dust collecting plate and the first connection unit) and the second dust collecting unit (the second dust collecting plate and the second connection unit).

DESCRIPTION OF REFERENCE NUMERALS

Figure 1:
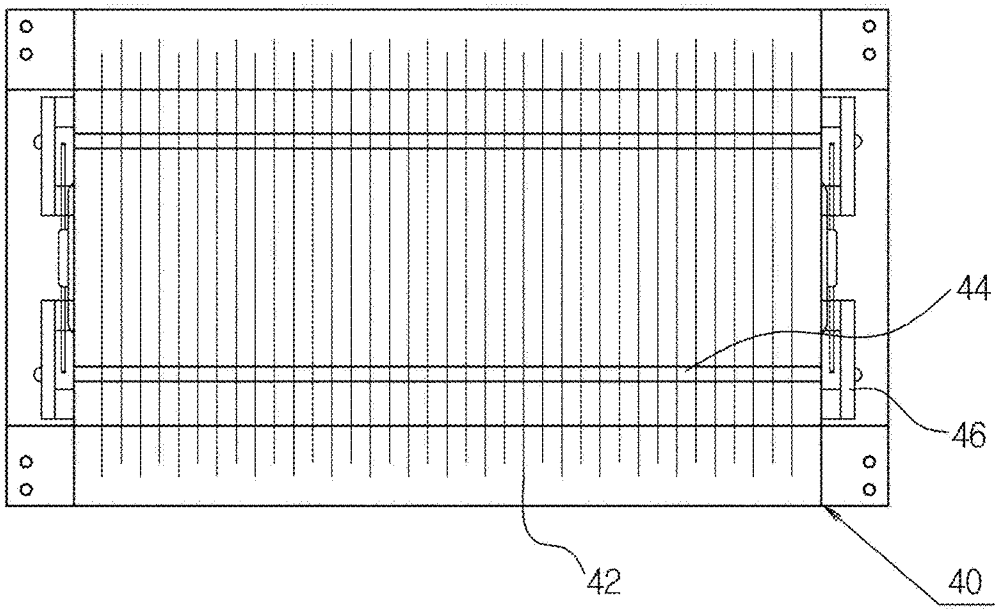
FIGS. 1 and 2 are a plan view and a partial cross-sectional view illustrating a conventional dust collecting apparatus of an electric precipitator.
Figure 2:
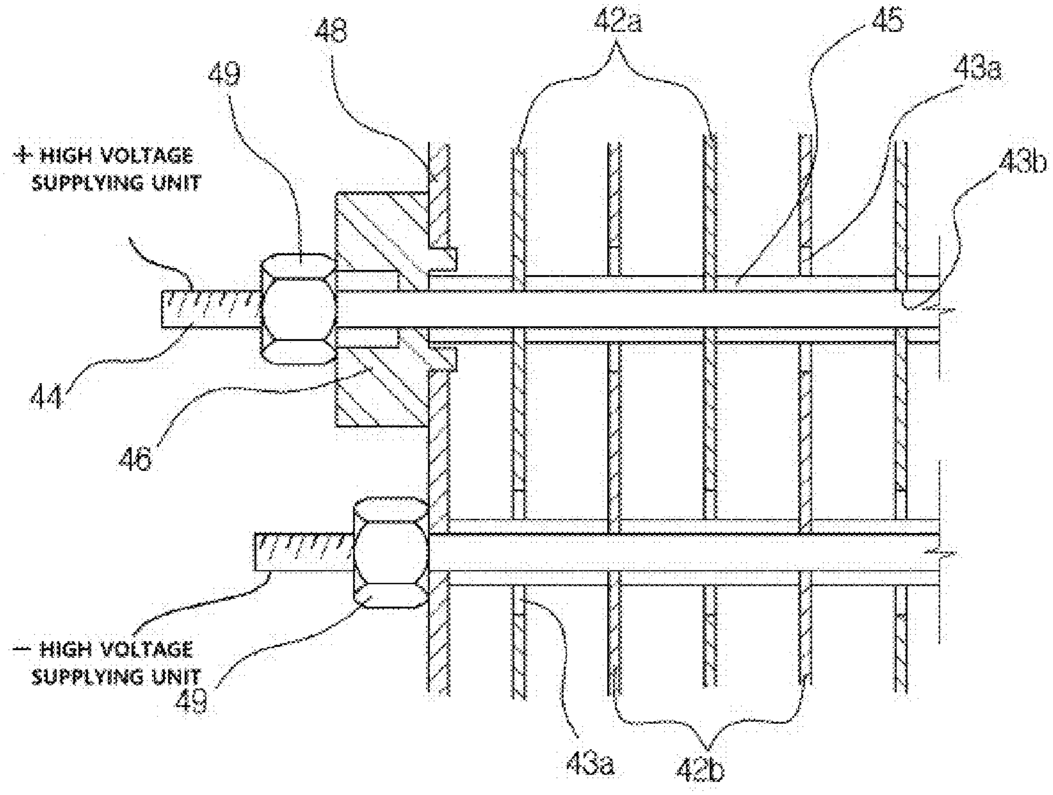

D: electric precipitator
1000: dust collecting apparatus for electric precipitator
100: first dust collecting module
110: first case
110*a*: first opening
111: first protruding fixing portion
111*a*: first protruding fixing portion
111*b*: second protruding fixing portion
112: first protruding supporting portion
113: first lead groove
120: first dust collecting unit
121: first dust collecting plate,
122: first connection unit
123: first electrode tab

124: first insertion groove
125: first cut-out groove
200: second dust collecting module
210: second case
210*a*: second opening
211: second protruding fixing portion
211*a*: third protruding fixing portion
211*b*: fourth protruding fixing portion
212: second protruding supporting portion
213: second lead groove
220: second dust collecting unit
221: second dust collecting plate
222: second connection unit
223: second electrode tab
224: second insertion groove
225: second cut-out groove
310: first fixing member
311: first support
320: second fixing member
321: second support
2000: charging device
A1: basic formation region of first protruding fixing portion and third protruding fixing portion
A2: extended formation region of first protruding fixing portion and third protruding fixing portion

BEST MODE

Hereinafter, a dust collecting apparatus 1000 for an electric precipitator according to the present invention having the configuration as described above will be described in detail with reference to the accompanying drawings.

Figure 3:
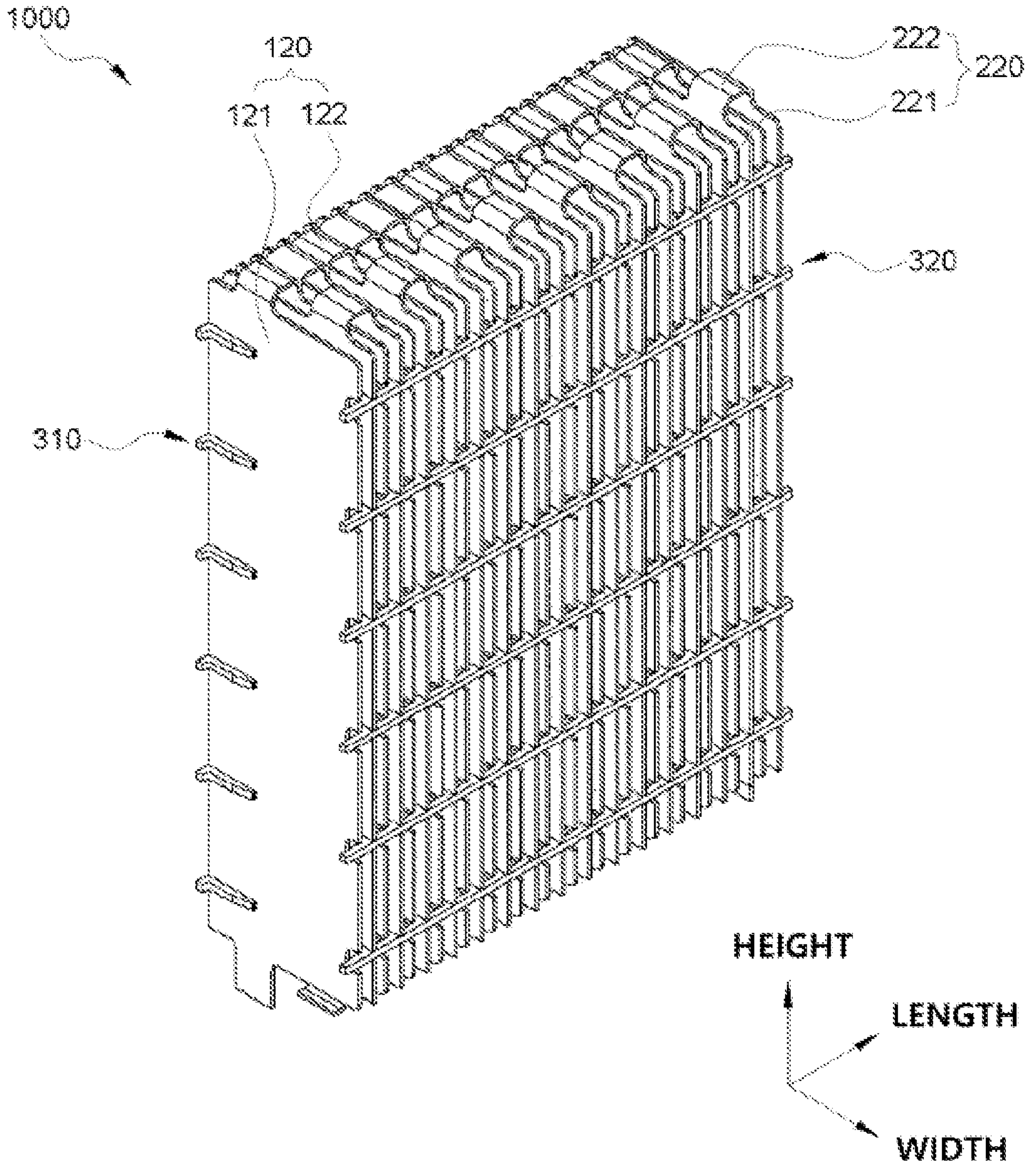
FIGS. 3 to 5 are a perspective view, an exploded perspective view, and a schematic view illustrating a dust collecting apparatus for an electric precipitator according to the present invention.
Figure 4:
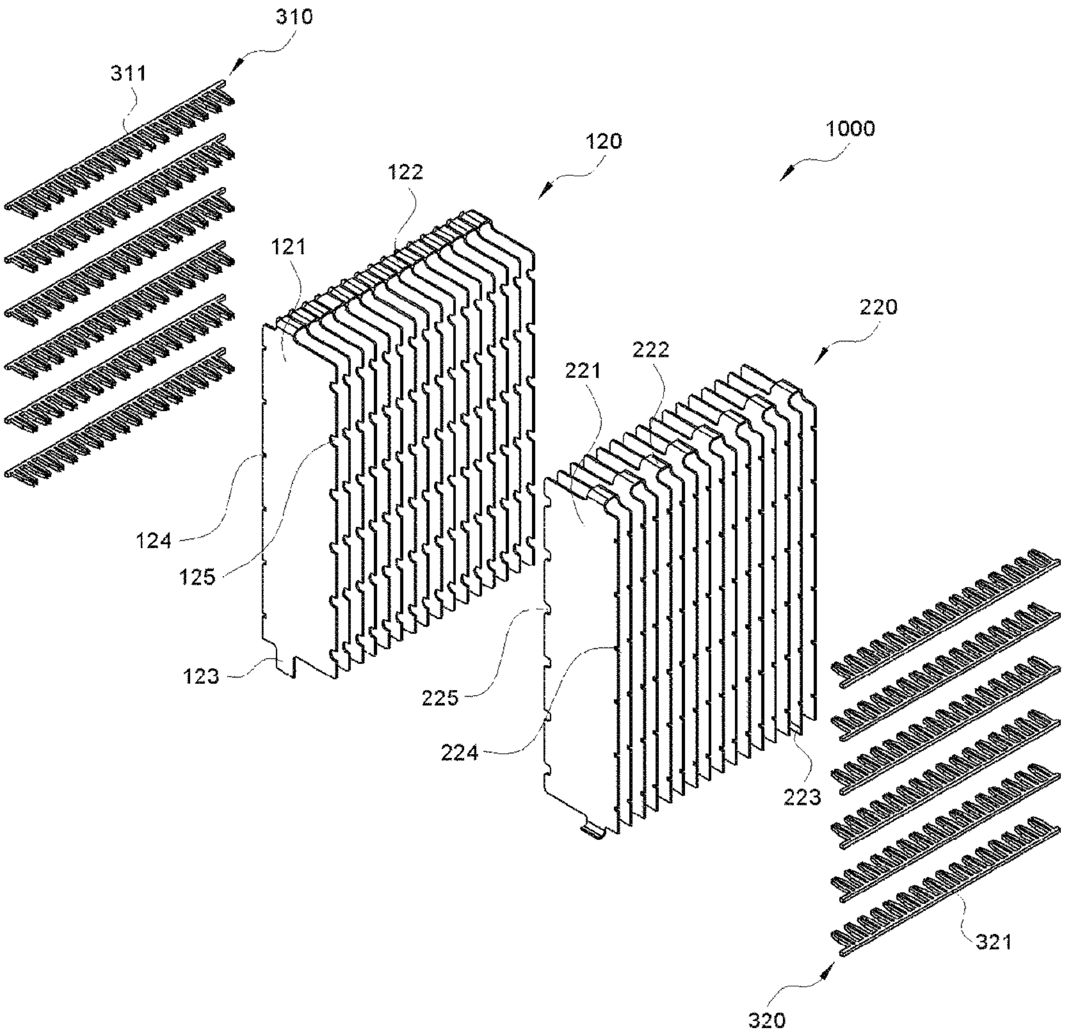
Figure 5:
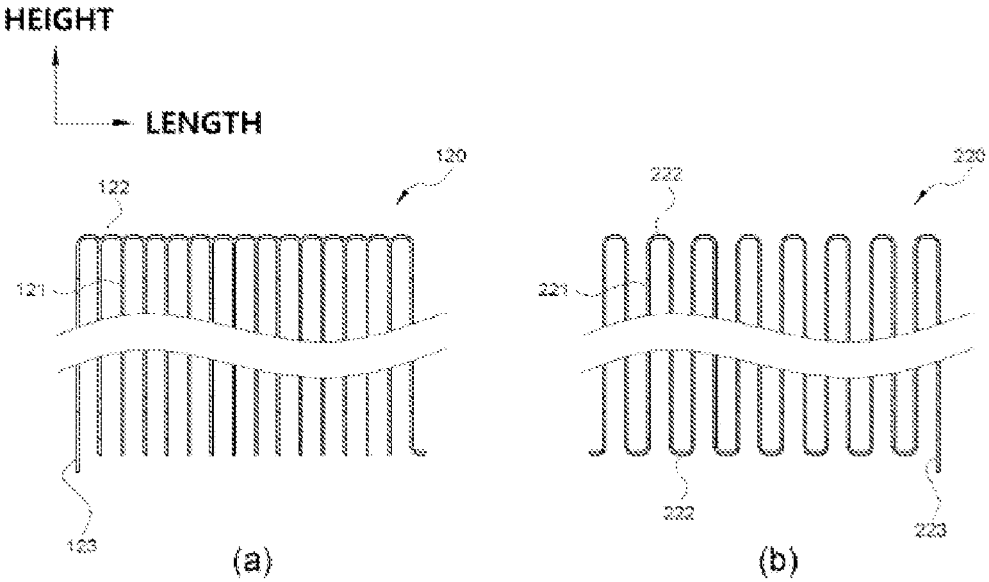
Figure 6:
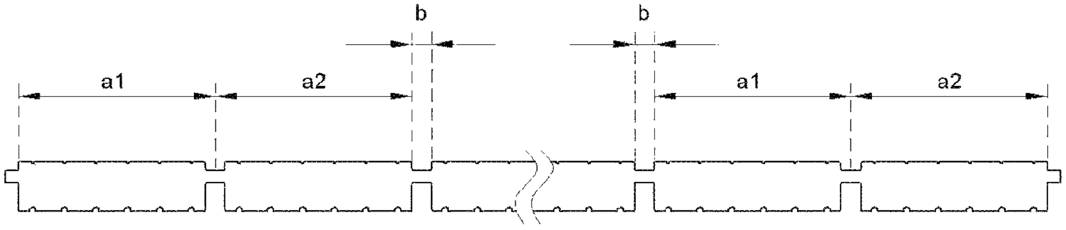
FIG. 6 is a view illustrating a manufacturing method of the dust collecting apparatus for an electric precipitator according to the present invention.
Figure 6:
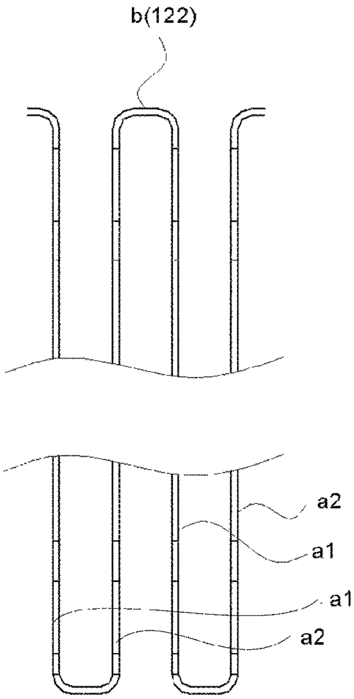
Figure 6:
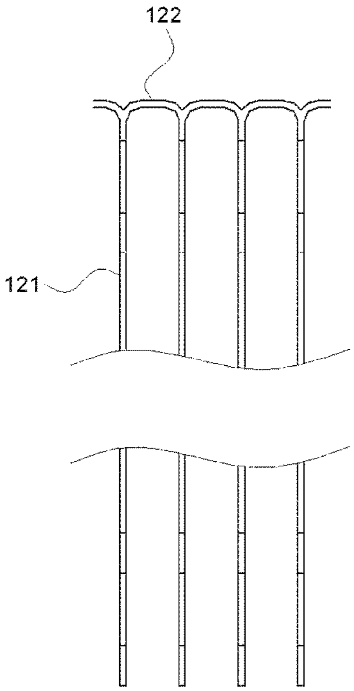
Figure 7:
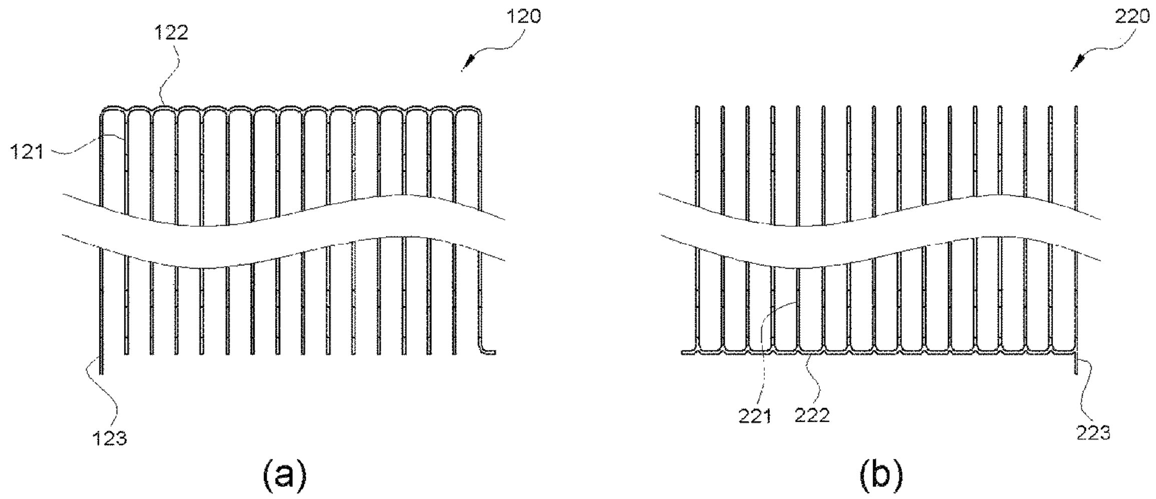
FIG. 7 is another schematic view illustrating the dust collecting apparatus for an electric precipitator according to the present invention.
Figure 8:
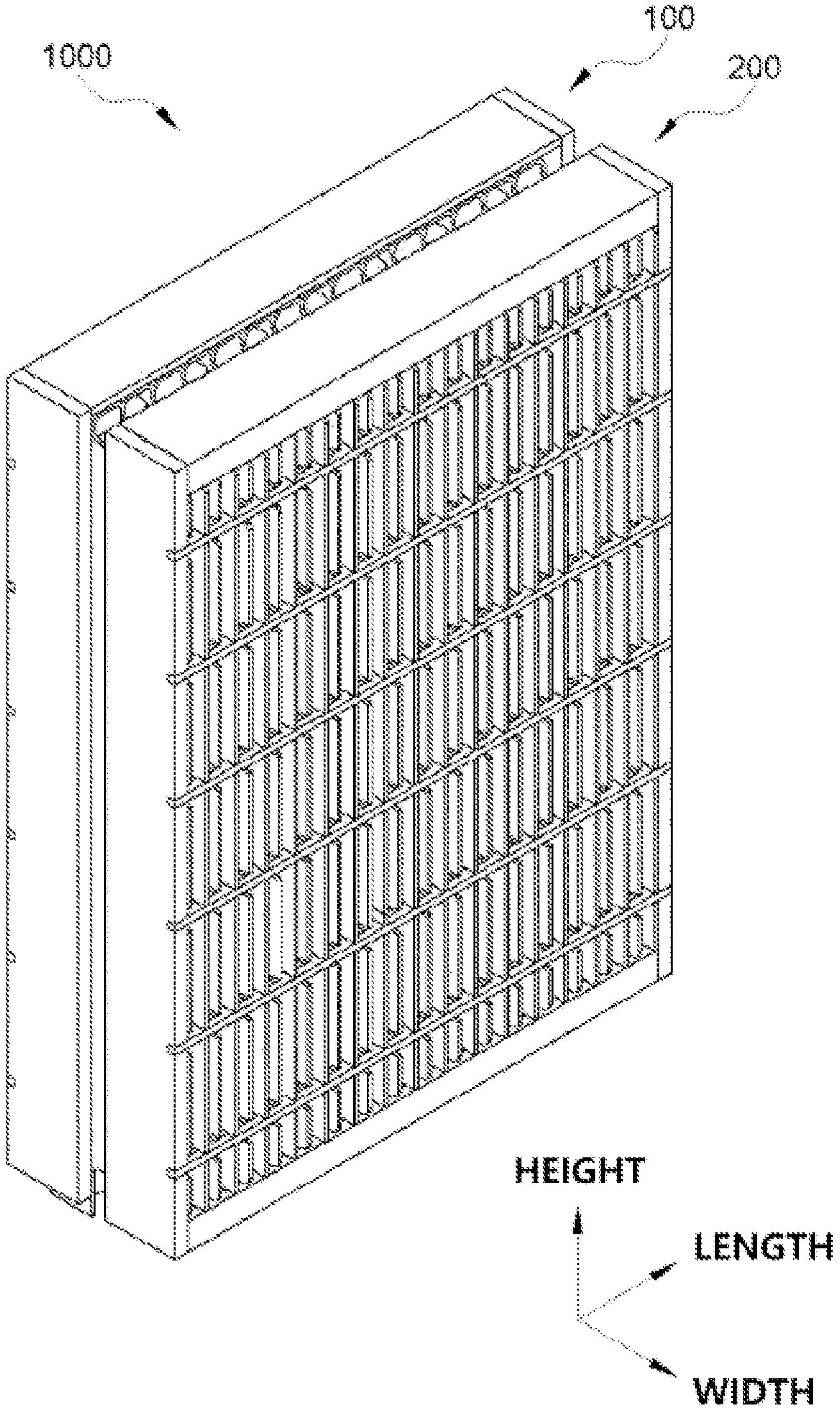
FIGS. 8 to 11 are another perspective view and an exploded perspective view of the dust collecting apparatus for an electric precipitator according to the present invention, an exploded perspective view of a first dust collecting unit, and an exploded perspective view of a second dust collecting unit.
Figure 9:
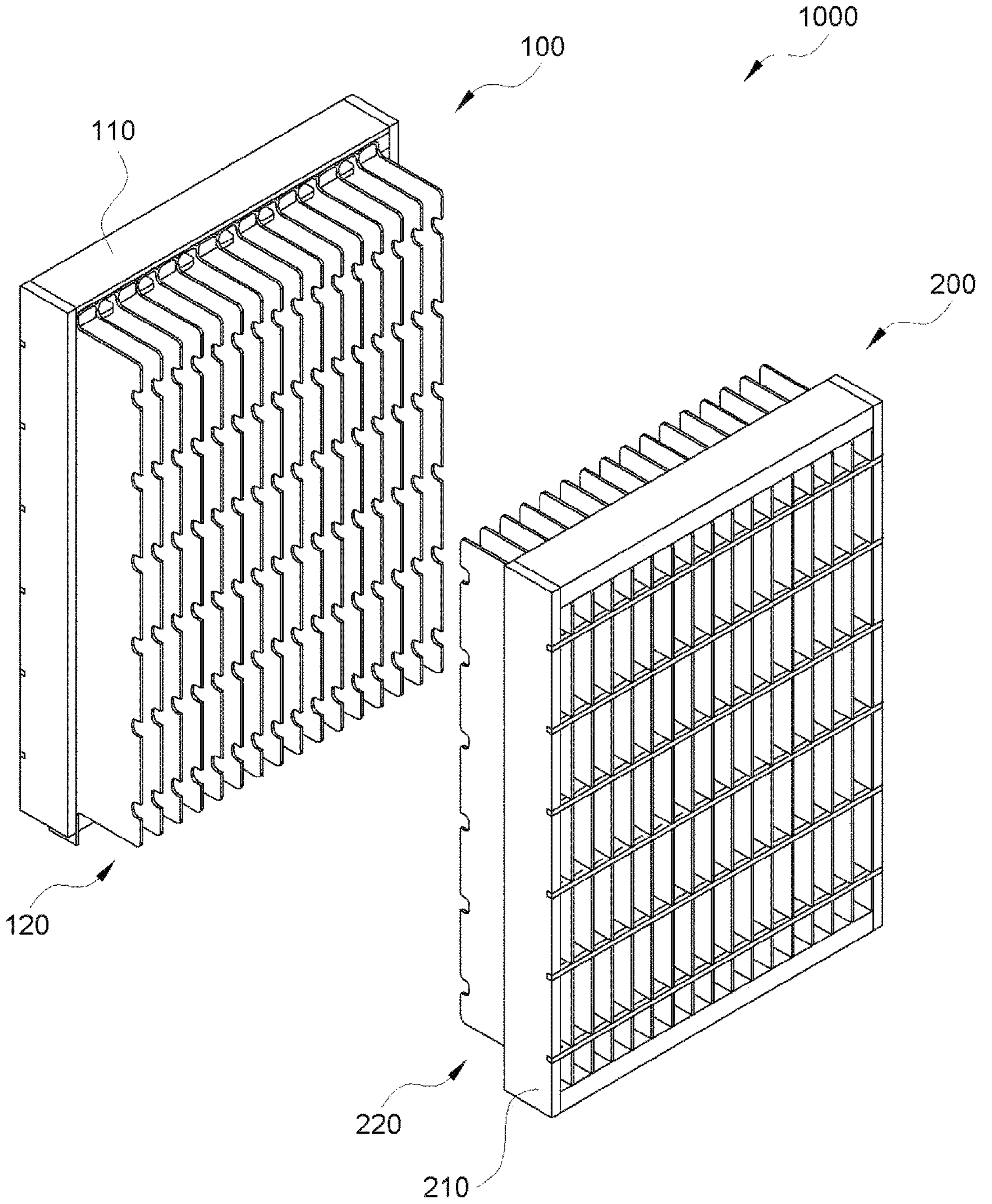
Figure 10:
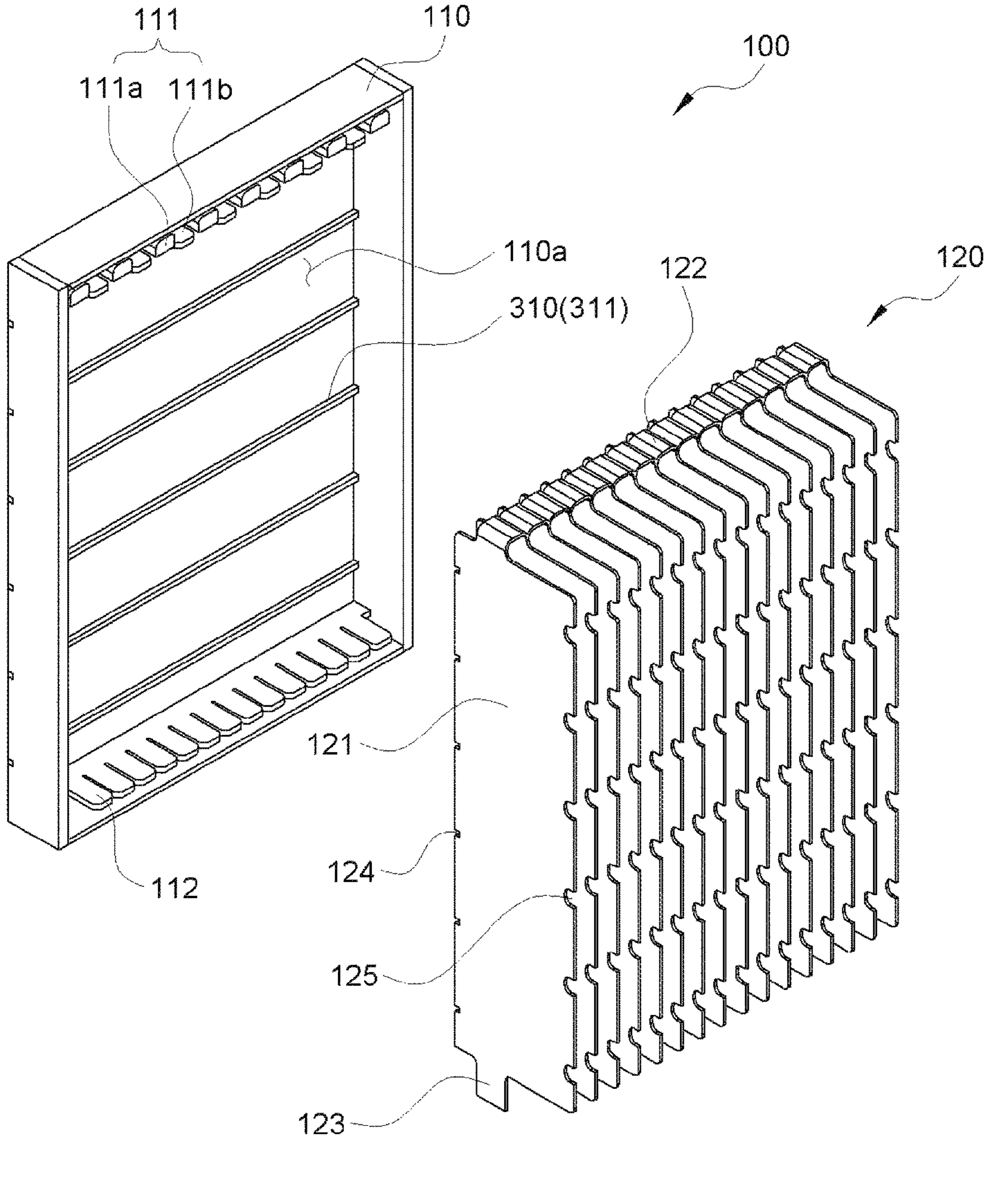
Figure 11:
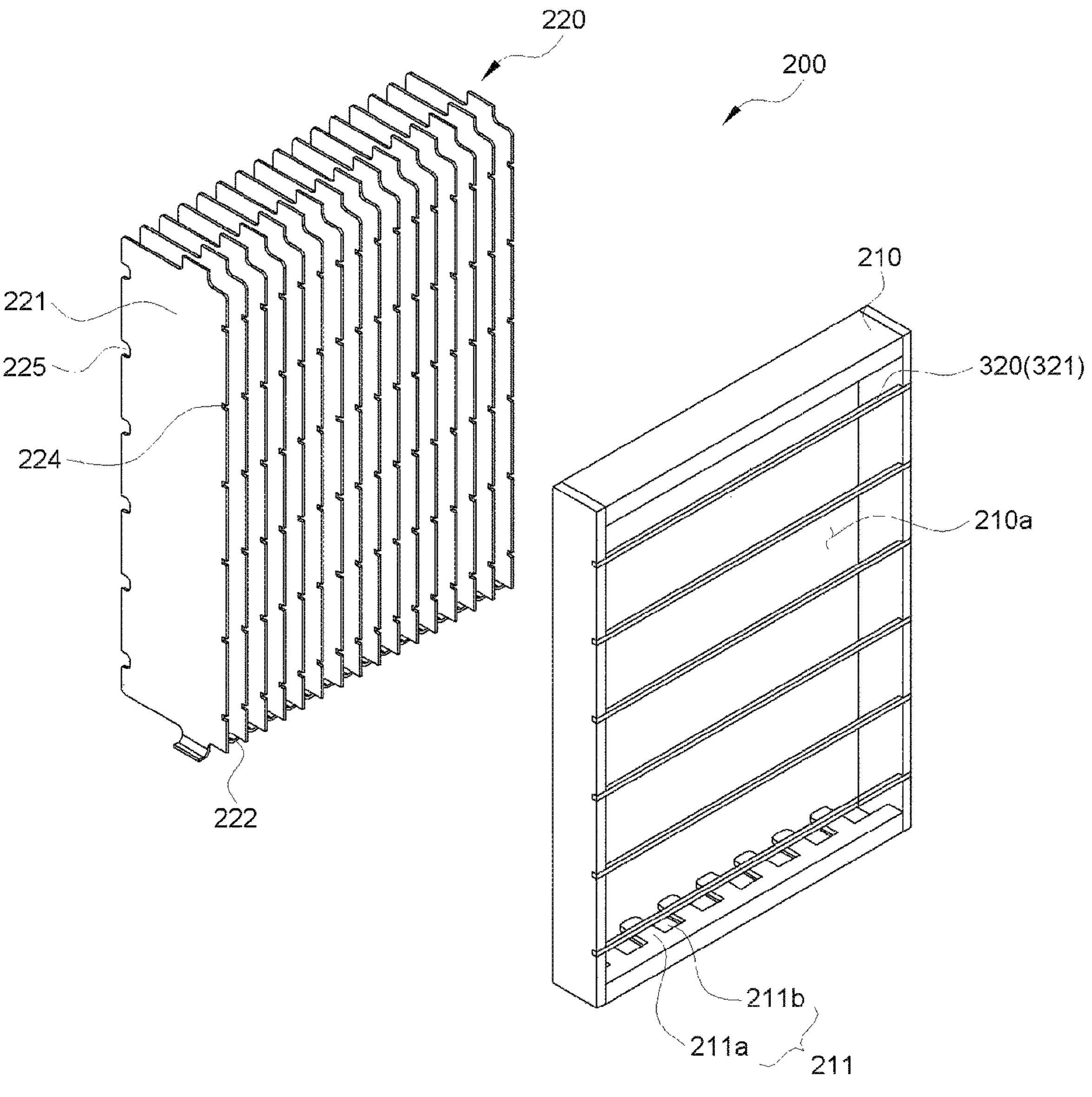
Figure 12:
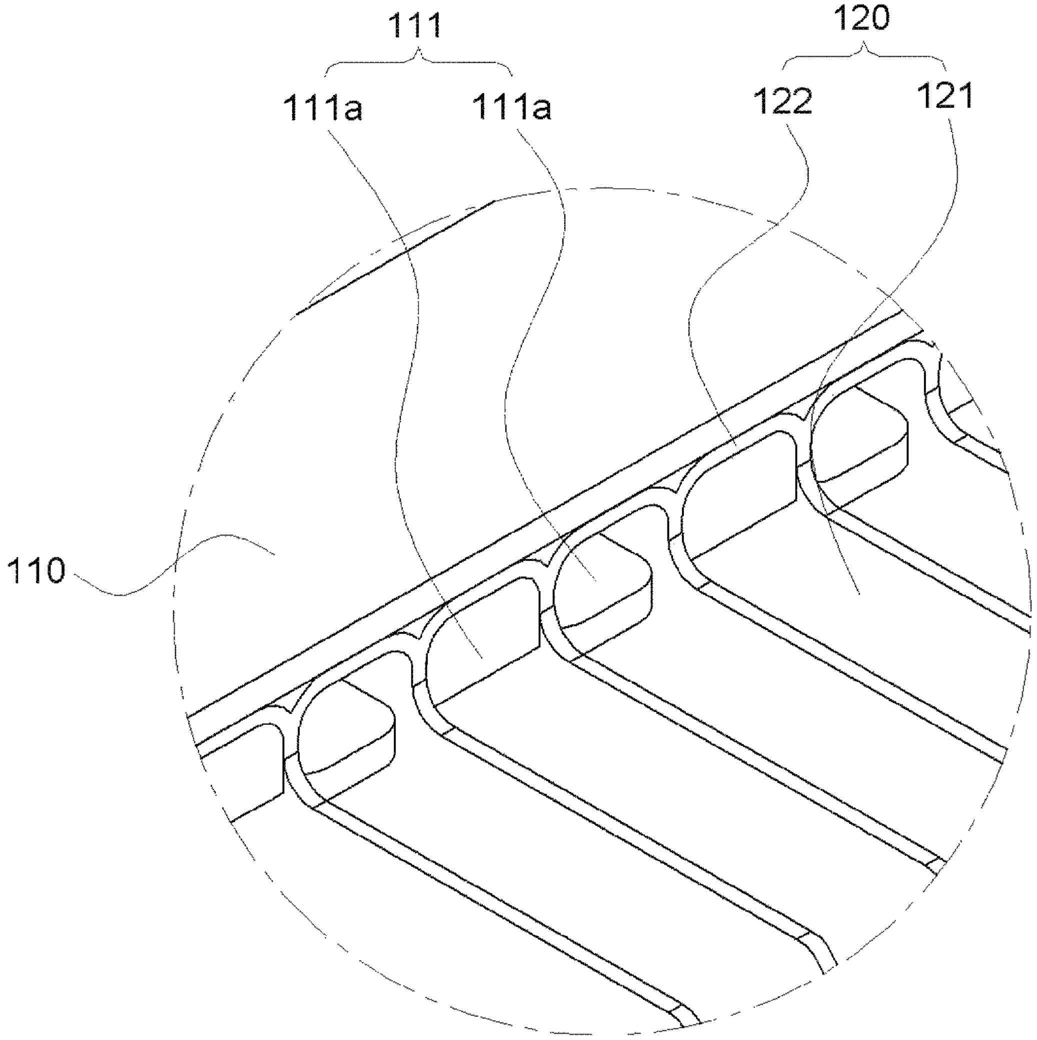
FIGS. 12 and 13 are a partial perspective view and a side view of the dust collecting apparatus for an electric precipitator according to the present invention.
Figure 13:
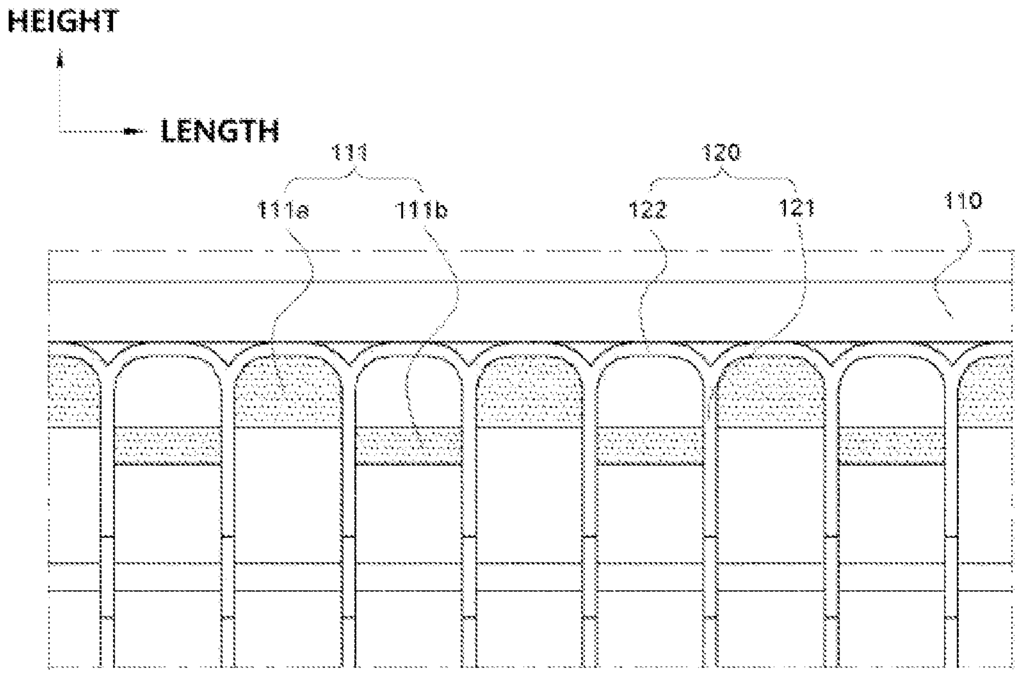
Figure 14:
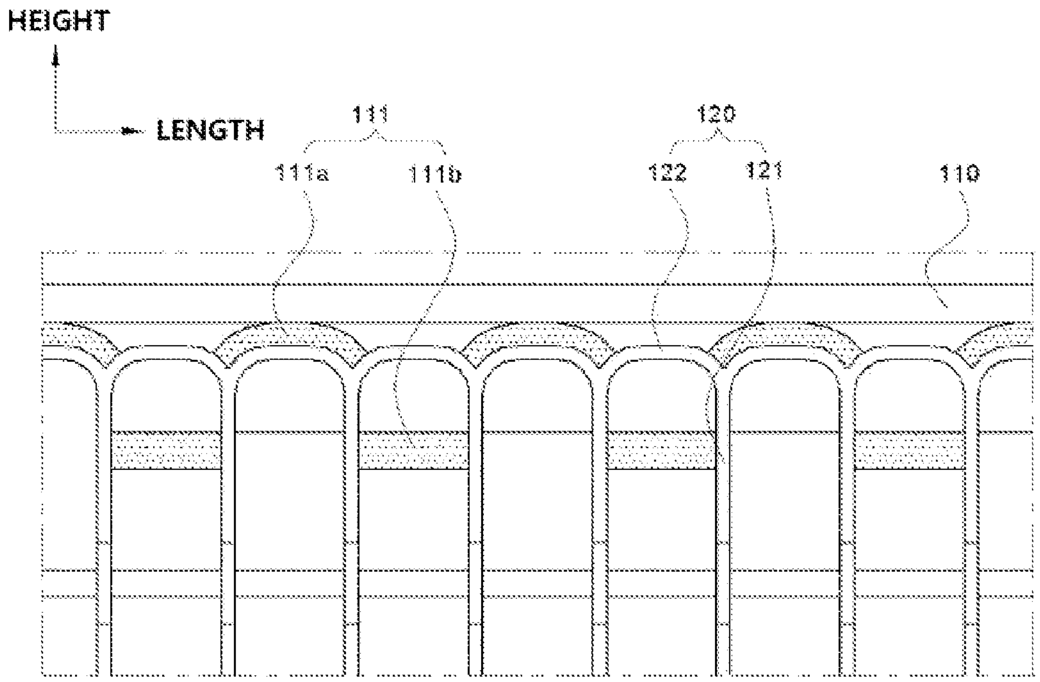
FIG. 14 is another side view of the dust collecting apparatus for an electric precipitator according to the present invention.
Figure 15:
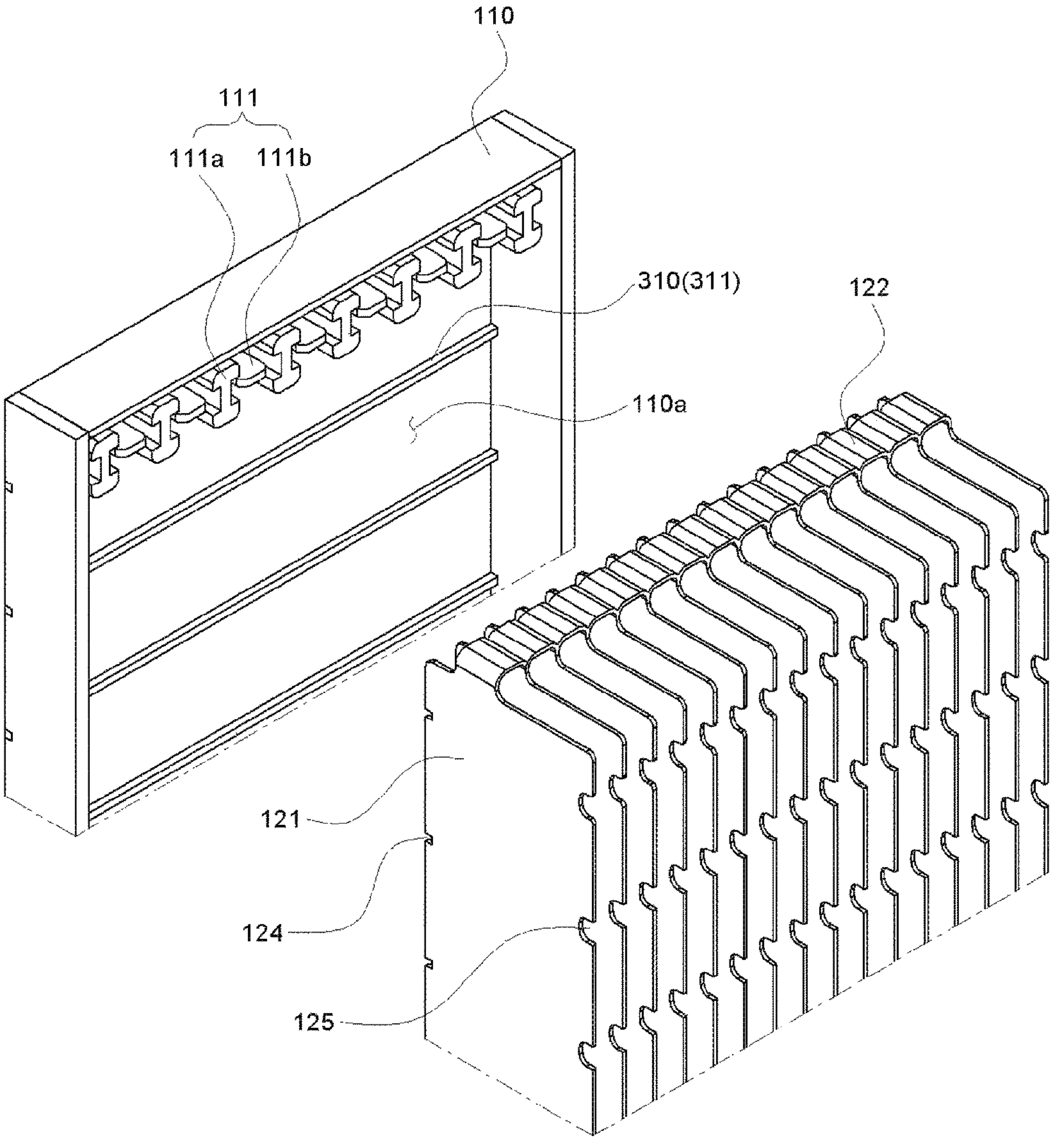
FIGS. 15 and 16 are another exploded perspective view and another side view of the dust collecting apparatus for an electric precipitator according to the present invention.
Figure 16:
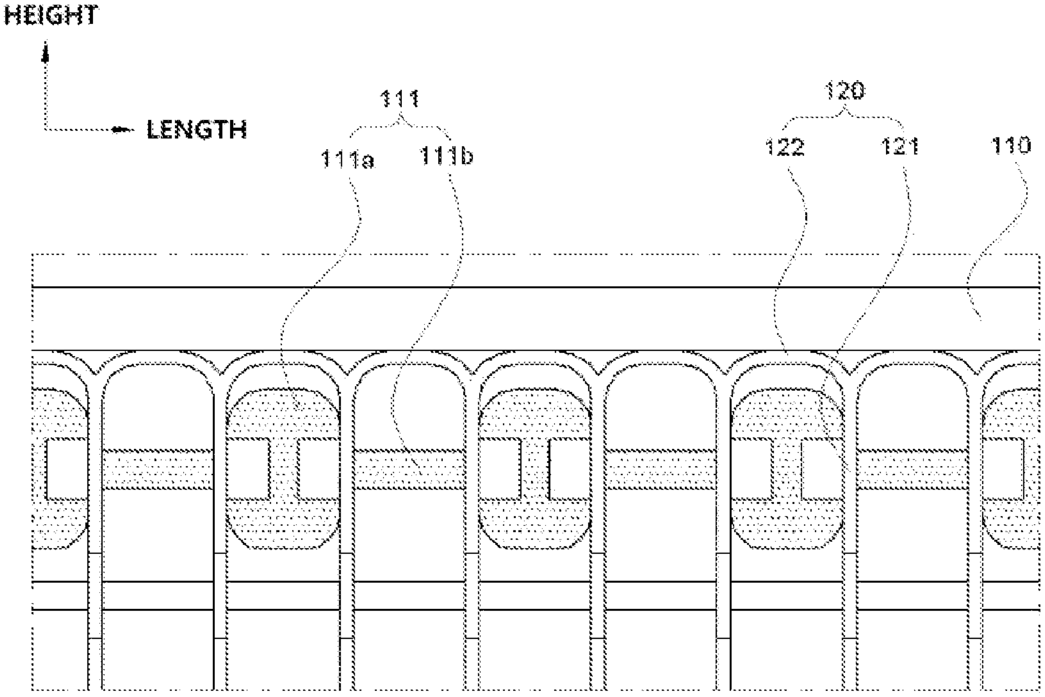
Figure 17:
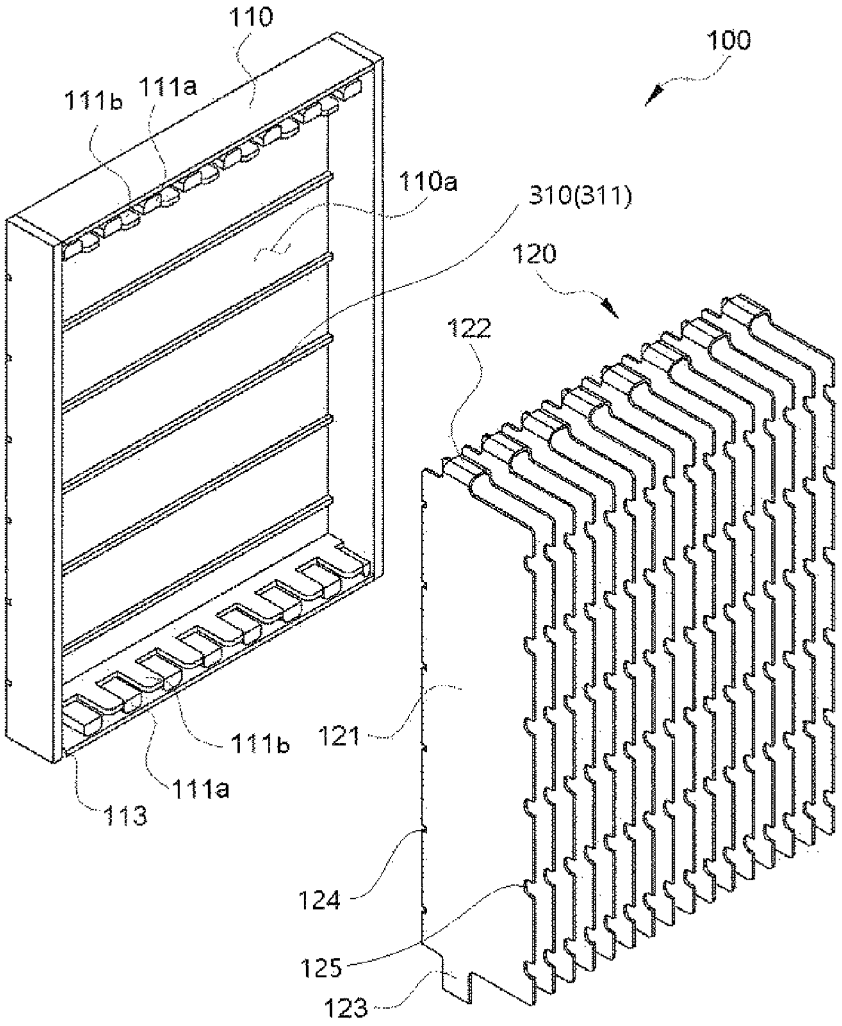
FIGS. 17 and 18 are exploded perspective views illustrating still another first dust collecting module and still another second dust collecting module of the dust collecting apparatus for an electric precipitator according to the present invention.
Figure 18:
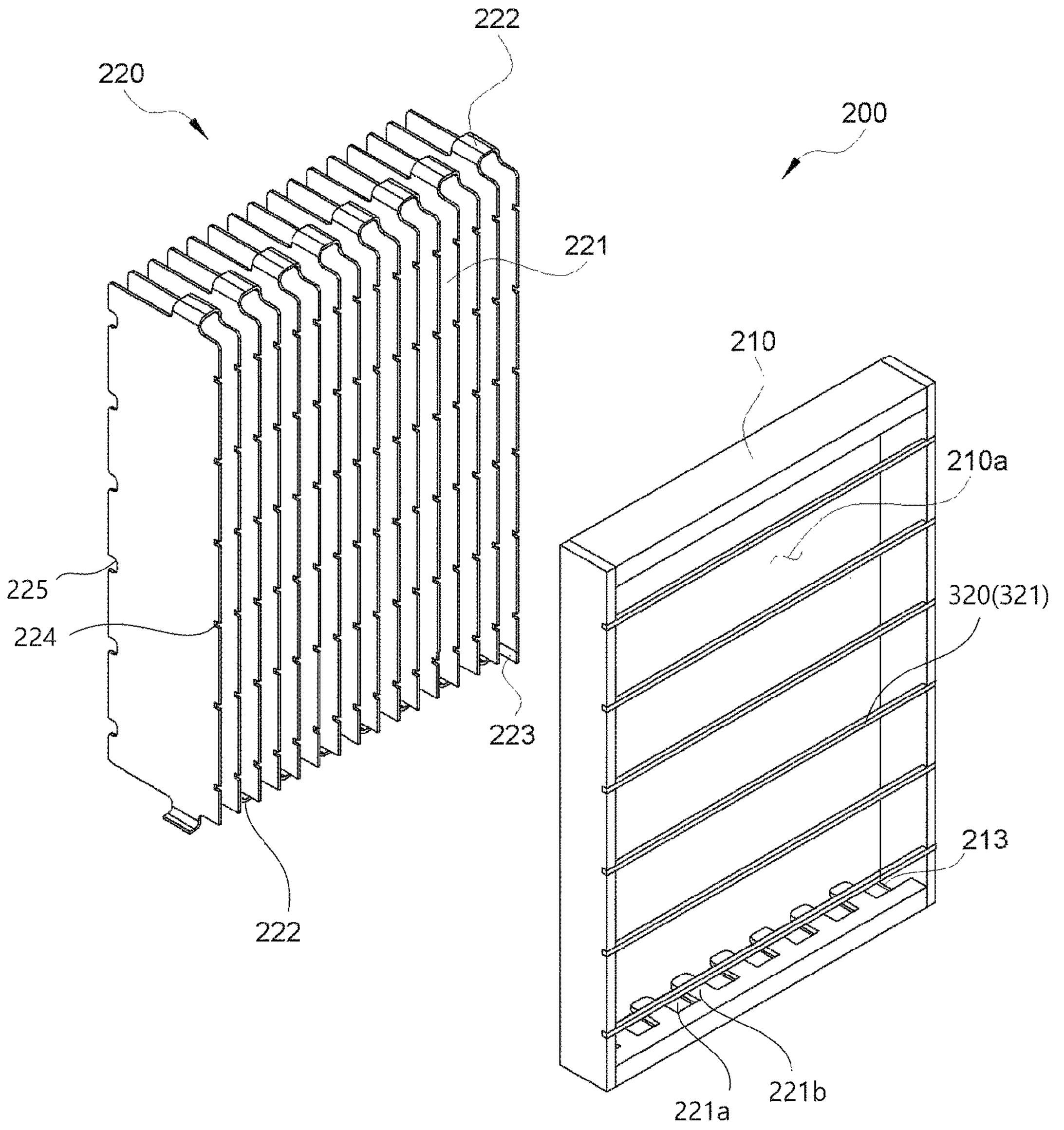
Figure 19:
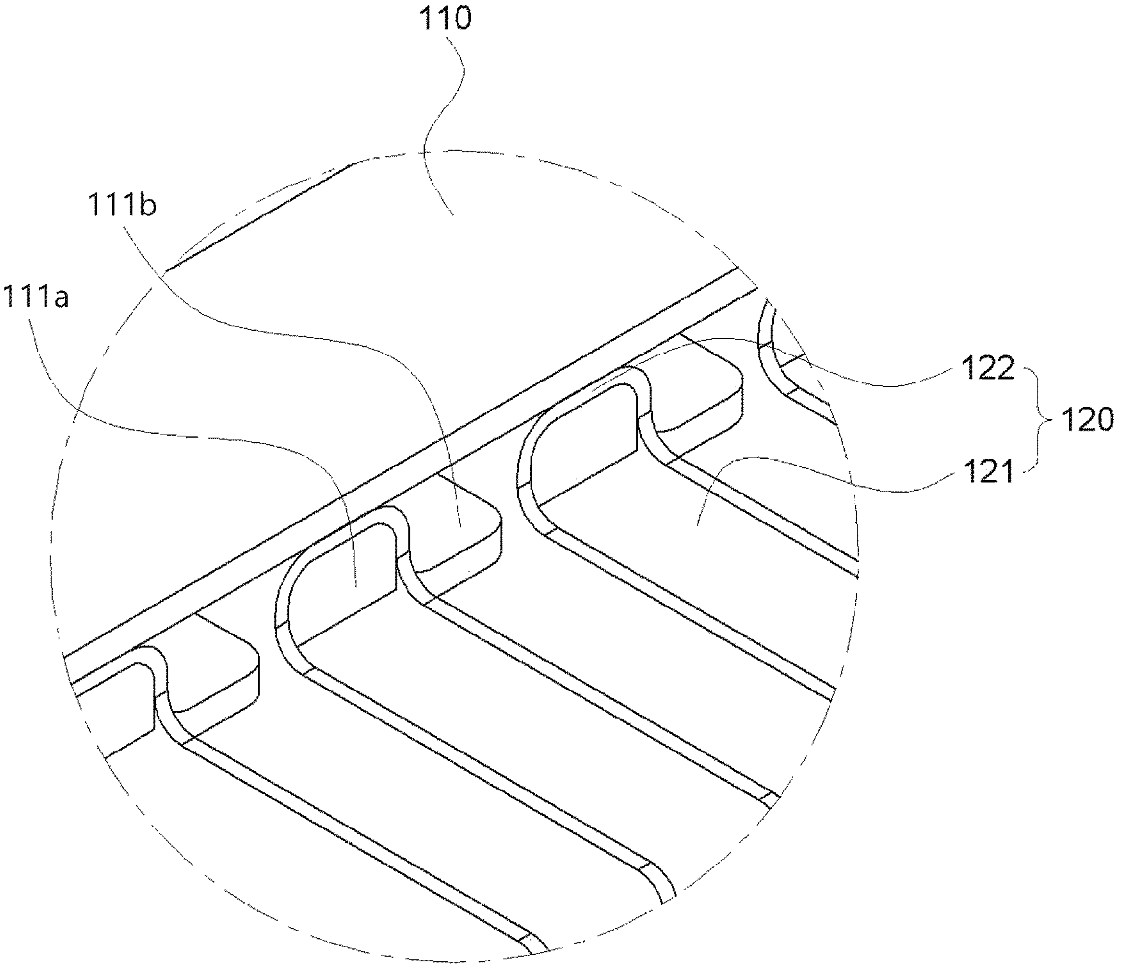
FIG. 19 is a partially enlarged perspective view of a first dust collecting module of the dust collecting apparatus for an electric precipitator according to the present invention.
Figure 20:
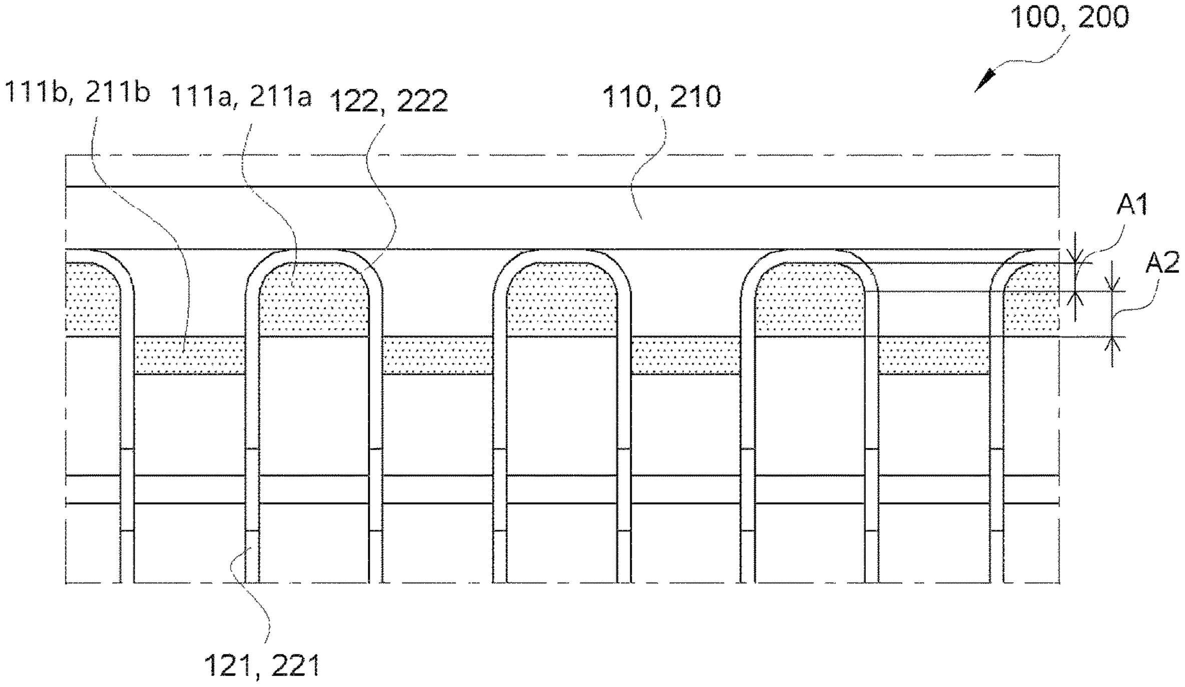
FIGS. 20 and 21 are still other views illustrating the dust collecting apparatus for an electric precipitator according to the present invention, respectively.
Figure 21:
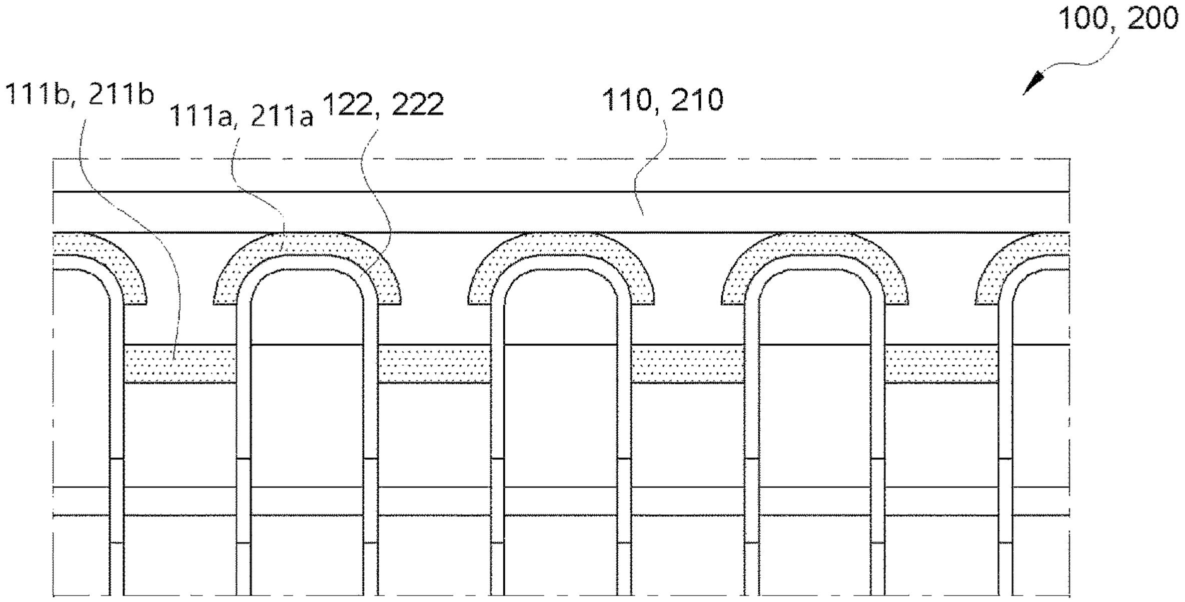
Figure 22:
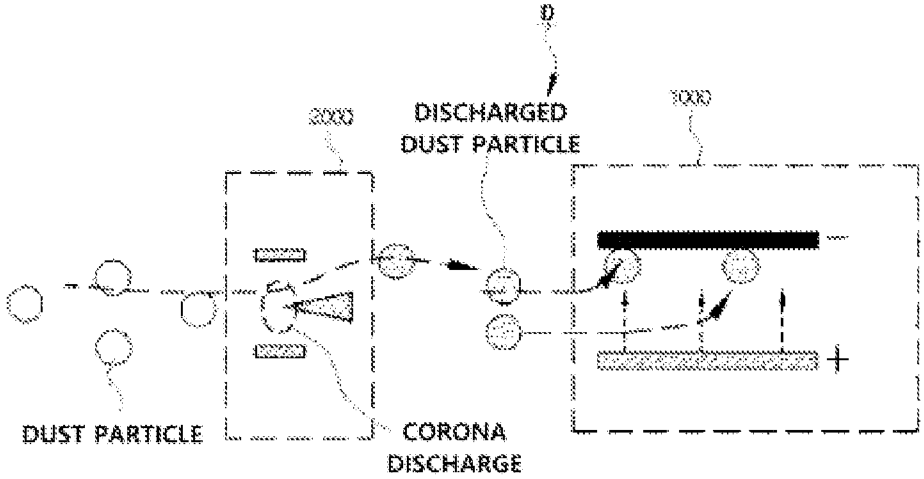
FIG. 22 is a view illustrating an electric precipitator according to the present invention.

FIGS. 3 to 5 are a perspective view, an exploded perspective view, and a schematic view illustrating a dust collecting apparatus 1000 for an electric precipitator according to the present invention, FIG. 6 is a view illustrating a manufacturing method of the dust collecting apparatus 1000 for an electric precipitator according to the present invention, FIG. is another schematic view illustrating the dust collecting apparatus 1000 for an electric precipitator according to the present invention, FIGS. 8 to 11 are another perspective view and an exploded perspective view of the dust collecting apparatus 1000 for an electric precipitator according to the present invention, an exploded perspective view of a first dust collecting unit 120, and an exploded perspective view of a second dust collecting unit 220, FIGS. 12 and 13 are a partial perspective view and a side view of the dust collecting apparatus 1000 for an electric precipitator according to the present invention, FIG. 14 is another side view of the dust collecting apparatus 1000 for an electric precipitator according to the present invention, FIGS. 15 and 16 are another exploded perspective view and another side view of the dust collecting apparatus 1000 for an electric precipitator according to the present invention, FIGS. 17 and 18 are exploded perspective views illustrating still another first dust collecting module 100 and still another second dust collecting module 200 of the dust collecting apparatus 1000 for an electric precipitator according to the present invention, FIG. 19 is a partially enlarged perspective view of a first dust collecting module 100 of the dust collecting apparatus 1000 for an electric precipitator according to the present invention, FIGS. 20 and 21 are still other views illustrating the dust collecting apparatus 1000 for an electric precipitator according to the present invention, respectively, and FIG. 22 is a view illustrating an electric precipitator D according to the present invention.

First, a dust collecting apparatus 1000 for an electric precipitator according to the present invention illustrated in FIGS. 3 to 16 will be described.

The dust collecting apparatus 1000 for an electric precipitator according to the present invention includes a first dust collecting unit 120, and the first dust collecting unit 120 includes a first dust collecting plate 121 and a first connection unit 122.

A plurality of the first dust collecting plates 121 are spaced apart from each other by a predetermined distance and disposed side by side.

The first connection unit 122 is continuously formed on one side of both end portions of the plurality of first dust collecting plates 121 to electrically connect the first dust collecting plates 121 in series. FIGS. 3 to 5 illustrate an example in which the first connection unit 122 is continuously formed on an upper side in a height direction which is one side of both end portions of the first dust collecting plate 121. The dust collecting apparatus 1000 for an electric precipitator according to the present invention may also have the first connection unit 122 continuously formed on a lower side in the height direction which is the other side of both end portions of the first dust collecting plate 121.

The first dust collecting unit 120 may be manufactured in a form including the first dust collecting plate 121 and the first connection unit 122 as described above by various methods, and as illustrated in FIG. 6, the first dust collecting plate 121 and the first connection unit 122 may be manufactured by using one sheet, thereby further increasing manufacturability. In more detail, after manufacturing a single sheet made of a conductive material and a dielectric material surrounding the conductive material as illustrated in FIG. 6A, the single sheet is bent as illustrated in FIG. 6B, and predetermined regions of the sheet are then bonded to each other as illustrated in FIG. 6C except for a region in which the first connection unit 122 is formed, thereby forming the first dust collecting plate 121. That is, two portions a1 and a2 of the sheet are bonded to each other to form one first dust collecting plate 121. In one sheet, a region a1, a region a2, a region b, the region a1, the region a2, and the region b are repeated to repeatedly form the first dust collecting plate 121 and the first connection unit 122. In this case, the sheet is formed in a form in which a conductive material is coated with a dielectric material, and the conductive material is surrounded by the dielectric material, and the conductive material may be various materials such as a carbon sheet having electrical conductivity, and the dielectric material may be a thin film such as plastic. In addition, a conductive material of a predetermined region may be exposed from an end portion of the sheet to form a first electrode tab 123 for power connection.

In addition, the dust collecting apparatus 1000 for an electric precipitator according to the present invention includes a second dust collecting unit 220 to which a high voltage is applied together with the first dust collecting unit 120.

The second dust collecting unit 220 may be formed in the same shape as the first dust collecting unit 120 (see the form illustrated in FIGS. 7 to 11), and includes a second dust collecting plate 221 and a second dust collecting unit 220. In more detail, a plurality of the second dust collecting plates 221 are spaced apart from each other by a predetermined distance and disposed side by side. The second connection unit 222 is continuously formed on the other side of both end portions of the second dust collecting plates 221 to electrically connect adjacent second dust collecting plates 221 in series. In this case, the second dust collecting unit 220 is fitted to the first dust collecting unit 120 so that the first dust collecting plate 121 and the second dust collecting plate 221 are alternately disposed while facing each other, and is disposed so as not to be in contact with the first dust collecting unit 120. That is, the first dust collecting plate 121 and the second dust collecting plate 221 are alternately disposed to be spaced apart by a predetermined distance, and when the first connection unit 122 of the first dust collecting unit 120 is located on the upper side in the height direction, the second connection unit 222 of the second dust collecting unit 220 is located on the lower side in the height direction.

When a high voltage is applied to the first dust collecting unit 120 and the second dust collecting unit 220, an electric field is formed therebetween, and as air containing dust particles anionized or cationized by a charging device 2000 is passed between the first dust collecting plate 121 and the second dust collecting plate 221, the cationized dust particles are absorbed and collected on the surfaces of the first dust collecting unit 120 and the second dust collecting unit 220 by the electric field (see FIG. 22).

The second dust collecting plate 221 and the second connection unit 222 of the second dust collecting unit 220 may also be manufactured using a single sheet in the same manner as illustrated in FIG. 6 to further increase manufacturability, and in addition, a conductive material of a predetermined region may be exposed from an end portion of the sheet to form a second electrode tab 223 for power connection.

Accordingly, the dust collecting apparatus 1000 for an electric precipitator according to the present invention may further increase dust collecting performance by increasing manufacturability and increasing electrical stability by using the connection unit continuously provided on one side of the plurality of dust collecting plates. In particular, the dust collecting apparatus 1000 for an electric precipitator according to the present invention may be simply manufactured in the form that is bonded to each other using one sheet except for the region where the connection unit is formed, may further increase productivity because it does not require the individual assembly process for power connection, and may be easy to assemble.

In addition, the second dust collecting unit 220 includes the second dust collecting plate 221 and the second connection unit 222, and as illustrated in FIGS. 3 to 5, the second connection unit 222 may be alternately formed at both end portions of the second dust collecting plate 221. In this case, the second dust collecting plate 221 and the second connection unit 222 may be formed by bending a single sheet.

Meanwhile, the dust collecting apparatus 1000 for an electric precipitator according to the present invention may include a first fixing member 310 and a second fixing member 320.

The first fixing member 310 includes a first support 311 elongated in a length direction, which is a stacking direction of the first dust collecting plate 121 and the second dust collecting plate 221 to fix a position of the first dust collecting plate 121.

The second fixing member 320 includes a second support 321 elongated in the length direction, which is the stacking direction of the first dust collecting plate 121 and the second dust collecting plate 221 to fix a position of the second dust collecting plate 221.

For the formation of the first fixing member 310 and the second fixing member 320, the first dust collecting plate 121 is formed with a first insertion groove 124 into which the first support 311 of the first fixing member 310 is inserted and fixed on one side in a width direction thereof, and is formed with a first cut-out groove 125 at which the second support 321 of the second fixing member 320 is located on the other side in the width direction thereof, and the second dust collecting plate 221 is formed with a second cut-out groove 225 at which the first support 311 of the first fixing member 310 is located on one side in the width direction thereof, and is formed with a second insertion groove 224 into which the second support 321 of the second fixing member 320 is inserted and fixed on the other side in the width direction thereof.

In addition, as illustrated in FIGS. 8 to 16, the dust collecting apparatus 1000 for an electric precipitator according to the present invention may have a form including a first case 110 and a second case 210. In the drawings, the first case 110 and the first dust collecting unit 120 are indicated as the first dust collecting module 100 of reference number 100, and the second case 210 and the second dust collecting unit 220 are indicated as the second dust collecting module 200 of reference number 200.

The first case 110 has a frame shape in which a first opening 110*a* with a hollow inside is formed, and the first dust collecting unit 120 is mounted and fixed therein. The first case 110 includes a first protruding fixing portion 111 supporting one side of the first dust collecting plate 121 and a first protruding supporting portion 112 supporting the other side of the first dust collecting plate 121. The first protruding fixing portion 111 is to support one side of the first dust collecting plate 121, which is the side on which the first connection unit 122 is formed, includes a first protruding fixing portion 111*a* and a second protruding fixing portion 111*b* which are formed to support the first dust collecting unit 120 at different heights, and may have variously formed shapes. The form illustrated in FIGS. 10, 12, and 13 illustrates an example in which the first protruding fixing portion 111*a* supports an end portion on one side of the first dust collecting plate 121 and an inner periphery of the first connection unit 122, the second protruding fixing portion 111*b* protrudes differently from the formation height of the first protruding fixing portion 111*a* to support the first dust collecting plate 121, and the first protruding fixing portion 111*a* and the second protruding fixing portion 111*b* are alternately formed in the stacking direction of the first dust collecting plate 121.

The form illustrated in FIG. 14 illustrates an example in which the first protruding fixing portion 111*a* supports an outer periphery of the first connection unit, the second protruding fixing portion 111*b* supports the first dust collecting plate 121, and the first protruding fixing portion 111*a* and the second protruding fixing portion 111*b* are alternately formed in the stacking direction of the first dust collecting plate 121.

The form illustrated in FIGS. 15 and 16 illustrates an example in which the first protruding fixing portion 111*a* protrudes in the length direction on the upper side and the lower side in the height direction as in the English capital letter "I" to have two regions supporting the first dust collecting plate 121, the second protruding fixing portion 111*b* supports the first dust collecting plate 121 between the two regions in the height direction, and the first protruding fixing portion 111*a* and the second protruding fixing portion 111*b* are alternately formed in the stacking direction of the first dust collecting plate 121.

The first protruding supporting portion 112 is to support the other side of the first dust collecting plate 121 in which the first connection unit 122 of the first dust collecting unit

120 is not formed, and the first dust collecting plates 121 may be fitted between the plurality of first protruding supporting portions 112.

In addition, the second case 210 has a frame shape in which a second opening 210*a* with a hollow inside is formed, and the second dust collecting unit 220 is mounted and fixed therein. The second case 210 includes a second protruding fixing portion 211 supporting the other side of the second dust collecting plate 221 and a second protruding supporting portion 212 supporting one side of the second dust collecting plate 221. The second protruding fixing portion 211 is to support the other side of the second dust collecting plate 221, which is the side on which the second connection unit 222 is formed, includes a third protruding fixing portion 211*a* and a fourth protruding fixing portion 211*b* which are formed to support the second dust collecting unit 220 at different heights, and may have variously formed shapes. The third protruding fixing portion 211*a* and the fourth protruding fixing portion 211*b* have the same shapes as those of the first protruding fixing portion 111*a* and the second protruding fixing portion 111*b*, and are formed on the lower side in the height direction as illustrated in FIG. 11 in consideration of the formation position of the second connection unit 222 of the second dust collecting unit 220.

In addition, the second protruding supporting portion 212 is to support the other side of the second dust collecting plate 221 in which the second connection unit 222 of the second dust collecting unit 220 is not formed, and the second dust collecting plates 221 may be fitted between the plurality of second protruding supporting portions 212.

In the dust collecting apparatus 1000 for an electric precipitator according to the present invention, the first fixing member 310 may be integrally formed with the first case 110, and the second fixing member 320 may be integrally formed with the second case 210.

On the other hand, the dust collecting apparatus 1000 for an electric precipitator according to the present invention having another form will be described. The dust collecting apparatus 1000 for an electric precipitator according to the present invention includes a first dust collecting unit 120 and a first case 110, and a first protruding fixing portion 111*a* for supporting the first connection unit 122 of the first dust collecting unit 120 is formed in the first case 110.

First, the first dust collecting unit 120 includes a first dust collecting plate 121 and a first connection unit 122. At this time, as described above, the first dust collecting unit 120 may have the form in which the first connection unit 122 is continuously formed on one side, and in addition, the first connection unit 122 may be alternately formed at both end portions of the plurality of first dust collecting plates 121 to electrically connect adjacent first dust collecting plates 121 in series. In the latter case, the first dust collecting unit 120 is formed in a corrugate form in which the first dust collecting plate 121, the first connection unit 122 connected to one side of the first dust collecting plate 121, the first dust collecting plate 121 connected to the first connection unit 122 and positioned side by side to be adjacent to another first dust collecting plate 121, and the first connection unit 122 connected to the other side of the first dust collecting plate 121 are repeatedly formed by bending a single sheet.

In addition, the dust collecting apparatus 1000 for an electric precipitator according to the present invention may further include a second dust collecting unit 220 and a second case 210. The second dust collecting unit 220 may have the form in which the second connection unit 222 is continuously formed on the other side, and in addition, the second connection unit 222 may be alternately formed at both end portions of the plurality of second dust collecting plates 221 to electrically connect the adjacent second dust collecting plates 221 in series.

The first case 110 has a frame shape in which a first hollow portion with a hollow inside is formed, and the first dust collecting unit 120 is fixed thereto. In more detail, a first protruding fixing portion 111*a* supporting the first connection unit 122 of the first dust collecting unit 120 is formed.

The first protruding fixing portion 111*a* may support all of the plurality of first connection units 122 or may be formed to support only a portion of the plurality of first connection units 122.

When the first connection unit 122 is alternately formed on both end portions of the first dust collecting plate 121, the first protruding fixing portion 111*a* may also be alternately formed at both end portions of the first case 110 to support the first connection unit 122, may also have a protruding shape to support the inside of a curved surface of the first connection unit 122 as illustrated in FIGS. 19 and 20, and may also have a protruding shape to support the outside of the curved surface of the first connection unit 122 as illustrated in FIG. 21.

In this case, the first protruding fixing portion 111*a* supports the first connection unit 122, but it is preferable to support not only both sides of the first dust collecting plate 121 in the length direction, but also a bent region of the first connection unit 122 connected to the first dust collecting plate 121. The minimum formation region of the first protruding fixing portion 111*a* having such a form is denoted by A1 in FIG. 20. In addition, in the dust collecting apparatus 1000 for an electric precipitator according to the present invention, the first protruding fixing portion 111*a* may extend to support a predetermined region of the first dust collecting plate 121 on both sides connected to the first connection unit 122 so as to maintain a gap between the first dust collecting plates 121. That is, the first protruding fixing portion 111*a* may support the first connection unit 122 and the predetermined region of the first dust collecting plate 121, and in FIG. 20, a region extending along with the minimum formation region of the first protruding fixing portion 111*a* is denoted by A2.

In addition, the second case 210 has a frame shape in which a second hollow portion with a hollow inside is formed, and the second dust collecting unit 220 is fixed thereto. In more detail, the second case 210 has a third protruding fixing portion 211 formed to support the second connection unit 222 of the second dust collecting unit 220.

The third protruding fixing portion 211*a* may support all of the plurality of second connection units 222 or may be formed to support only a portion of the plurality of second connection units 222.

The third protruding fixing portion 211 having the same shape as the first protruding fixing portion 111*a* of the first case 110 is a portion supporting the second connection unit 222, may also have a protruding shape to support the inside of a curved surface of the second connection unit 222 as illustrated in FIGS. 19 and 20, and may also have a protruding shape to support the outside of the curved surface of the second connection unit 222 as illustrated in FIG. 21.

In addition, the third protruding fixing portion 211 also supports the second connection unit 222, similarly to the first protruding fixing portion 111*a*, but may support up to a bent region of the second connection unit 222 connected to the second dust collecting plate 221. In addition, in the dust collecting apparatus 1000 for an electric precipitator according to the present invention, the third protruding fixing portion 211 may extend to support the second dust collecting plates 221 on both sides connected to the second connection unit 222 so as to maintain a gap between the second dust collecting plates 221. That is the third protruding fixing portion 211 may support the second connection unit 222 and a predetermined region of the second dust collecting plate 221.

In addition, in the dust collecting apparatus 1000 for an electric precipitator according to the present invention, a second protruding fixing portion 111*b* may be further formed in the first case, and a fourth protruding fixing portion 211*b* may be further formed in the second case 210.

The second protruding fixing portion 111*b* protrudes to support the first dust collecting plate 121 at a different height from the first protruding fixing portion 111*a* inside the first protruding fixing portion 111*a* in the length direction of the dust collecting apparatus 1000.

That is, the second protruding fixing portion 111*b* is configured to support the first dust collecting plate 121 between the first protruding fixing portions 111*a* of the first case 110, and the first case 110 may have the first protruding fixing portion 111*a* and the second protruding fixing portion 111*b* alternately formed from one side to the other side in the arrangement direction of the first dust collecting plate 121.

A case in which the first connection unit 122 is alternately formed at both end portions of the first dust collecting plate 121 will be described. In more detail, when the first dust collecting plate 121 extending downward with the first connection unit 122 formed on the upper side from one side to the other side in the arrangement direction of the first dust collecting plate 121 is defined as A, and the first dust collecting plate 121 that is connected to the lower side so as to be connected to A and extends upward is defined as B, A and B are repeatedly formed. In this case, in the first case 110 of the upper side, the first connection unit 122 of A is supported by the first protruding fixing portion 111*a*, the second protruding fixing portion 111*b* supports between A and B, and such a form is repeated. In the first case 110 of the lower side, the region of A on which the first connection unit 122 is not formed may be supported by the second protruding fixing portion 111*b*, and the second connection unit 222 of B may be supported by the first protruding fixing portion 111*a*.

In addition, the fourth protruding fixing portion 211*b* protrudes to support the second dust collecting plate 221 at a different height from the third protruding fixing portion 211*a* inside the third protruding fixing portion 211*a* in the length direction of the dust collecting apparatus 1000.

The fourth protruding fixing portion 211*b* is configured to support the second dust collecting plate 221 between the third protruding fixing portions 211 of the second case 210 in the same form as the second protruding fixing portion 111*b*, and the second case 210 may have the third protruding fixing portion 211 and the fourth protruding fixing portion 211*b* alternately formed from one side to the other side in the arrangement direction of the second dust collecting plate 221.

Meanwhile, it is preferable that the first protruding fixing portion 111*a* is formed at an end portion of the second protruding fixing portion 111*b* in the length direction of the dust collecting apparatus 1000, the second protruding fixing portion 111*b* is formed inside the first protruding fixing portion 111*a* in the length direction of the dust collecting apparatus 1000, the third protruding fixing portion 211 is formed at an end portion of the second case 210 in the length direction of the dust collecting apparatus 1000, and the fourth protruding fixing portion 211*b* is formed inside the third protruding fixing portion 211 in the length direction of the dust collecting apparatus 1000. That is, the first protruding fixing portion 111*a* and the second protruding fixing portion 111*b* are portions between which the first dust collecting unit 120 is seated, and it is preferable that the second protruding fixing portion 111*b* is located inside the first protruding fixing portion 111*a* so that the first dust collecting unit 120 may be easily mounted while the first dust collecting unit 120 may be fixed at a more accurate position by supporting both sides of the first dust collecting unit 120. The fourth protruding fixing portion 211*b* also fixes the second dust collecting unit 220 at an accurate position, and it is preferable that the fourth protruding fixing portion 211*b* is located inside the third protruding fixing portion 211 so that the second dust collecting unit 220 is easily mounted.

Additionally, in the first dust collecting unit 120, a first electrode tab 123 extends from an end portion opposite to the side to which the first connection unit 122 of the first dust collecting plate 121 disposed on the outermost side is connected, and in the second dust collecting unit 220, a second electrode tab 223 extends from an end portion opposite to the side to which the second connection unit 222 of the second dust collecting plate 221 disposed at the outermost side is connected. The first case 110 is formed with a first lead groove 113 in which a predetermined region is hollow so that the first electrode tab 123 of the first dust collecting unit 120 is exposed to the outside of the first case 110 and electrically connected thereto, and the second case 210 is formed with a second lead groove 213 in which a predetermined region is hollow so that the second electrode tab 223 of the second dust collecting unit 220 is exposed to the outside of the second case 210 and electrically connected thereto. In this case, the first electrode tab 123 and the second electrode tab 223 protrude in the same direction in the height direction of the first dust collecting plate 121 and the second dust collecting plate 221, and are preferably formed opposite to each other in the arrangement direction of the first dust collecting plate 121 and the second dust collecting plate 221 so that the first dust collecting unit 120 and the second dust collecting unit 220 are easily assembled.

The electric precipitator according to the present invention may include the charging device 2000 that applies a charge to dust particles introduced from the outside, and the dust collecting apparatus 1000 having the above-described characteristics, thereby effectively collecting dust charged through various types of charging devices 2000.

The present invention is not limited to the above-mentioned embodiments, but may be variously applied. In addition, the present invention may be variously modified by those skilled in the art to which the present invention pertains without departing from the gist of the present invention claimed in the claims.

The invention claimed is:

1. A dust collecting apparatus for an electric precipitator, the dust collecting apparatus comprising:

a first dust collecting unit including a plurality of first dust collecting plates disposed side-by-side to be spaced apart by a predetermined distance, wherein each of the first dust collecting plates have two end portions and a plurality of first connection units continuously formed on one side of both end portions of the plurality of first dust collecting plates configured to electrically connect adjacent first dust collecting plates; and a second dust collecting unit including a plurality of second dust collecting plates disposed side-by-side to be spaced apart by a predetermined distance, and a plurality of second connection units continuously formed on the other side of both end portions of the second dust collecting plates configured to electrically connect adjacent second dust collecting plates in series, fitted to the first dust collecting unit such that the first dust collecting plate and the second dust collecting plate are alternately disposed while facing each other, and disposed so as not to be in contact with the first dust collecting unit; and a first support elongated in the length direction to include a first fixing member that fixes a position of the plurality of first dust collecting plates; and a second support elongated in the length direction to include a second fixing member that fixes a position of the second dust collecting plate;

wherein the plurality of first dust collecting plates are formed with a first insertion groove into which the first support of the first fixing member is inserted and fixed on one side in a width direction and is formed with a first cut-out groove in which the second support of the second fixing member is located on the other side in the width direction, and the second dust collecting plate is formed with a second cut-out groove in which the first support of the first fixing member is located on one side in a width direction and is formed with a second insertion groove into which the second support of the second fixing member is inserted and fixed on the other side in the width direction.

2. The dust collecting apparatus as claimed in claim 1, further comprising a first case in which a first opening a with a hollow inside is formed, and a first protruding fixing portion supporting one side of one of the plurality of first dust collecting plates on which the plurality of first connection units of the first dust collecting unit is formed.

3. The dust collecting apparatus as claimed in claim 2, wherein the first protruding fixing portion is alternately formed with a first protruding fixing portion and a second protruding fixing portion that support the first dust collecting unit at different heights in a length direction of the plurality of first dust collecting plates and in a stacking direction of the first dust collecting plate.

4. The dust collecting apparatus as claimed in claim 2, wherein the first case is formed with a first protruding fixing supporting portion that supports another side of the plurality of first dust collecting plates on which the first connection unit of the first dust collecting unit is not formed.

5. The dust collecting apparatus as claimed in claim 2, further comprising a second case in which a second opening a with a hollow inside is formed, and a second protruding fixing portion supporting the other side of the plurality of first dust collecting plates on which the plurality of second connection units of the second dust collecting unit is formed.

6. The dust collecting apparatus as claimed in claim 5, wherein the second protruding fixing portion is alternately formed with a third protruding fixing portion and a fourth protruding fixing portion that support the second dust collecting unit at different heights in a length direction of the second dust collecting plate and in a stacking direction of the plurality of second dust collecting plates.

7. The dust collecting apparatus as claimed in claim 5, wherein the second case is formed with a first protruding fixing supporting portion and a second protruding fixing supporting portion that supports one side of the plurality of second dust collecting plates on which the plurality of second connection units of the second dust collecting unit is not formed.

8. The dust collecting apparatus as claimed in claim 1, wherein the first dust collecting unit is formed using a single sheet made of a conductive material and a dielectric material surrounding the conductive material, and the plurality of first dust collecting plates is formed by bonding predetermined regions of the sheet to each other in a length direction of the sheet except for a region where the first connection unit is formed.

9. The dust collecting apparatus as claimed in claim 1, wherein the second dust collecting unit is formed using a single sheet made of a conductive material and a dielectric material surrounding the conductive material, and the plurality of second dust collecting plates is formed by bonding predetermined regions of the sheet to each other in a length direction of the sheet except for a region where the second connection unit is formed.

10. The dust collecting apparatus as claimed in claim 1, further comprising a second dust collecting unit including the plurality of second dust collecting plates disposed side-by-side to be spaced apart by a predetermined distance, and the plurality of second connection units alternately formed at both end portions of the plurality of second dust collecting plates to electrically connect adjacent second dust collecting plates of the plurality of second dust collecting plates in series, fitted to the second dust collecting unit such that the plurality of first dust collecting plates and the second dust collecting plate are alternately disposed while facing each other, and disposed so as not to be in contact with the first dust collecting unit.

11. The dust collecting apparatus as claimed in claim 10, wherein the second dust collecting unit is formed by bending a single sheet.

12. A dust collecting apparatus for an electric precipitator, the dust collecting apparatus comprising:

a first dust collecting unit including a plurality of first dust collecting plates disposed side-by-side to be spaced apart by a predetermined distance, and a plurality of first connection units electrically connecting adjacent first dust collecting plates in series; and a first case in which a first opening with a hollow inside is formed, and a first protruding fixing portion supporting the first connection unit of the first dust collecting unit is formed; and a second dust collecting unit including a plurality of second dust collecting plates disposed side-by-side to be spaced apart by a predetermined distance, and a plurality of second connection units electrically connecting adjacent second dust collecting plates in series, fitted to the first dust collecting unit such that the first dust collecting plate and the second dust collecting plate are alternately disposed while facing each other, and disposed so as not to be in contact with the first dust collecting unit; and a second case in which a second opening with a hollow inside is formed, and a third protruding fixing portion supporting the second connection unit of the second dust collecting unit is formed;

wherein the first case is formed with the first protruding fixing portion at an end portion in a length direction of the first dust collecting unit, and is formed with a second protruding fixing portion that protrudes to support the first dust collecting plate at a different height from the first protruding fixing portion inside the first protruding fixing portion in a length direction of the dust collecting apparatus.

13. The dust collecting apparatus as claimed in claim 12, wherein the plurality of first connection units is one of (1) alternately formed on both end portions of the plurality of first dust collecting plates and (2) continuously formed on one side of both end portions of the plurality of first dust collecting plates.

14. The dust collecting apparatus as claimed in claim 12, wherein the second connection unit is one of (1) alternately formed on both end portions of the plurality of second dust collecting plates and (2) continuously formed on the other side of both end portions of the plurality of second dust collecting plates.

15. The dust collecting apparatus as claimed in claim 12, wherein the first protruding fixing portion is in the form of supporting up to a bent region of the first connection unit connected to the first dust collecting plate, and the third protruding fixing portion is in the form of supporting up to a bent region of the second connection unit connected to the second dust collecting plate.

16. The dust collecting apparatus as claimed in claim 15, wherein the first protruding fixing portion and the third protruding fixing portion protrude to support the inside or outside of a curved surface of the first connection unit and the second connection unit, respectively.

17. The dust collecting apparatus as claimed in claim 15, wherein the first protruding fixing portion extends to support the first dust collecting plates on both sides connected to the first connection unit, and the third protruding fixing portion extends to support the second dust collecting plates on both sides connected to the second connection unit.

18. The dust collecting apparatus as claimed in claim 12, wherein the second case is formed with the third protruding fixing portion at an end portion in a length direction of the second dust collecting unit, and is formed with a fourth protruding fixing portion that protrudes to support the second dust collecting plate at a different height from the third protruding fixing portion inside the third protruding fixing portion in a length direction of the dust collecting apparatus.

* * * * *